US012561771B2

(12) United States Patent
Yamazaki et al.

(10) Patent No.: US 12,561,771 B2
(45) Date of Patent: Feb. 24, 2026

(54) IMAGE PROCESSING APPARATUS, METHOD FOR CONTROLLING IMAGE PROCESSING APPARATUS, AND STORAGE MEDIUM

(71) Applicant: CANON KABUSHIKI KAISHA, Tokyo (JP)

(72) Inventors: Haruna Yamazaki, Chiba (JP); Tomoki Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 265 days.

(21) Appl. No.: 18/533,859

(22) Filed: Dec. 8, 2023

(65) Prior Publication Data

US 2024/0202888 A1 Jun. 20, 2024

(30) Foreign Application Priority Data

Dec. 16, 2022 (JP) ................................. 2022-201045

(51) Int. Cl.
| | |
|---|---|
| *G06T 5/80* | (2024.01) |
| *G06T 1/60* | (2006.01) |
| *G06T 3/602* | (2024.01) |

(52) U.S. Cl.
CPC .................. *G06T 5/80* (2024.01); *G06T 1/60* (2013.01); *G06T 3/602* (2013.01); *G06T 2207/20021* (2013.01); *G06T 2207/30176* (2013.01)

(58) Field of Classification Search
None
See application file for complete search history.

(56) References Cited

U.S. PATENT DOCUMENTS

| | | | | |
|---|---|---|---|---|
| 6,611,347 B1 * | 8/2003 | Okada | .................... | G06K 15/02 |
| | | | | 358/1.18 |
| 7,116,445 B2 * | 10/2006 | Uchiyama | .............. | H04N 1/405 |
| | | | | 358/3.06 |
| 7,675,523 B2 * | 3/2010 | Ushida | .................. | G06T 1/0007 |
| | | | | 345/572 |
| 8,805,119 B2 | 8/2014 | Yamaji | | |
| 2012/0230607 A1 * | 9/2012 | Yamaji | ...................... | G06T 1/60 |
| | | | | 382/296 |
| 2013/0258383 A1 * | 10/2013 | Nitta | ......................... | G06T 3/60 |
| | | | | 358/1.13 |
| 2019/0295222 A1 * | 9/2019 | Mizukura | ............... | G06T 3/606 |
| 2025/0292356 A1 * | 9/2025 | Zimmer | .................... | G06T 1/60 |

FOREIGN PATENT DOCUMENTS

| | | | | | |
|---|---|---|---|---|---|
| CN | 110300239 A | * | 10/2019 | .......... | H04N 1/3877 |
| JP | 2006048355 A | * | 2/2006 | | |
| JP | 2011-107965 A | | 6/2011 | | |

* cited by examiner

*Primary Examiner* — Delomia L Gilliard
(74) *Attorney, Agent, or Firm* — Venable LLP

(57) ABSTRACT

An image processing apparatus includes a ring buffer memory configured to store a partial image representing part of a block image obtained by dividing a band image obtained by dividing a scanned image in a unit of a band, further in a unit of a block; a memory control unit configured to control a storage status of the partial image in the ring buffer memory, a processing unit configured to perform rotation processing on the partial image stored in the ring buffer memory and output a rotated partial image, and a combining unit configured to combine a plurality of the rotated partial images outputted from the processing unit and output a rotated block image corresponding to the block image before being divided.

10 Claims, 16 Drawing Sheets

DOCUMENT
CONVEYANCE
APPARATUS
200

G'

G 201a    201b 202a    202b

M    M 203a    203b

INPUT PIXEL

INPUT PIXEL OF INTEREST

OUTPUT PIXEL

OUTPUT PIXEL OF INTEREST

DISTANCE BETWEEN
PIXEL A AND PIXEL B

DISTANCE BETWEEN
PIXEL A AND PIXEL C

O  INPUT PIXEL

⊘  INPUT START PIXEL

⊙  OUTPUT PIXEL

●  OUTPUT START PIXEL

IP_INIT_POS_PIX_X

IP_INIT_POS_PIX_Y

IP_INIT_POS_PIX    IP_INIT_POS_FRC_X clm_rate_x

IP_INIT_POS_FRC_Y clm_rate_y row_rate_y row_rate_x

32768

32768

[1] READ FIRST LINE

[2] READ SECOND LINE

[3] READ THIRD LINE

[4] PROCESS AND OUTPUT ONE PIXEL

[5] PROCESS AND OUTPUT ONE LINE

[6] DISCARD FIRST LINE

[1] READ FIRST LINE

[2] READ SECOND LINE

[3] PROCESS AND OUTPUT PROCESSIBLE PIXELS

[4] READ THIRD LINE

[5] PROCESS AND OUTPUT ONE LINE

[6] DISCARD FIRST LINE 1600    1603

1601
1602
1601

1603

[1]
[2]
[3]
[4]
[5]

1604

1600    1603

1601
1601    1605

IMAGE PROCESSING APPARATUS, METHOD FOR CONTROLLING IMAGE PROCESSING APPARATUS, AND STORAGE MEDIUM

BACKGROUND OF THE DISCLOSURE

Field of the Disclosure

The present disclosure relates to a technique for performing rotation correction on an image.

Description of the Related Art

In the event where an original document is scanned by a scanner in a multifunction peripheral, a scanned image may be distorted as a result of the original document skewing during conveyance. There is known a technique for performing rotation correction, in units of blocks, on an uncorrected image stored in a main memory which is an external memory and displaying or rendering the image after the rotation correction. For example, in Japanese Patent Laid-Open No. 2011-107965 (hereinafter, referred to as Document 1), pre-rotation image is read into an internal cache memory in units of blocks, and rotation processing is performed in the internal cache memory. Block images obtained by the rotation are arranged like tiles and are displayed on a display apparatus as a post-rotation output image. In the rotation processing, the numbers of vertical and horizontal pixels of an output block image are changed depending on the size of the internal cache memory. This enables efficient use of the internal cache memory, improving the cache hit ratio and improving the speed of rotating a pre-rotation image and displaying a post-rotation image.

SUMMARY OF THE DISCLOSURE

An image processing apparatus according to the present disclosure is an image processing apparatus that performs rotation correction on a scanned image obtained by scanning of an original document, including: a ring buffer memory configured to store a partial image representing part of a block image obtained by dividing a band image obtained by dividing the scanned image in a unit of a band, further in a unit of a block; a memory control unit configured to control a storage status of the partial image in the ring buffer memory; a processing unit configured to perform rotation processing on the partial image stored in the ring buffer memory and output a rotated partial image; and a combining unit configured to combine a plurality of the rotated partial images outputted from the processing unit and output a rotated block image corresponding to the block image before being divided, wherein the memory control unit sequentially discards, from the ring buffer memory, the partial image having been subjected to the rotation processing by the processing unit and sequentially stores, in the ring buffer memory, the partial image to be subjected to the subsequent rotation processing.

Further features of the present disclosure will become apparent from the following description of exemplary embodiments with reference to the attached drawings.

DESCRIPTION OF THE EMBODIMENTS

Figure 1:
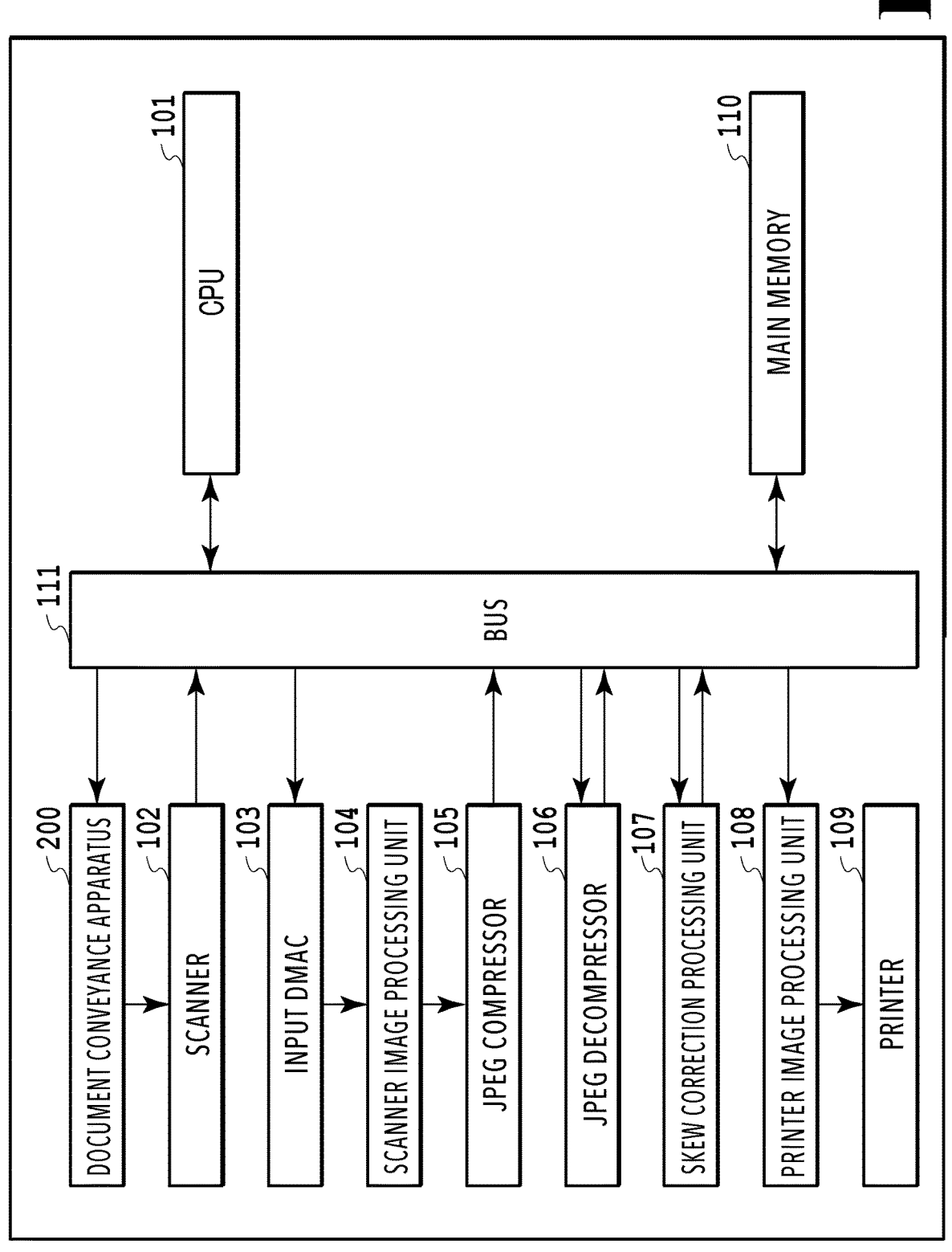
FIG. 1 is a block diagram of an image processing apparatus.

Hereinafter, with reference to the attached drawings, the present disclosure is explained in detail in accordance with preferred embodiments. Configurations shown in the following embodiments are merely exemplary and the present disclosure is not limited to the configurations shown schematically. In addition, the same components are denoted by the same reference numerals. Further, each process (step) in the flowcharts is denoted by a reference numeral starting with S.

In the technique described in Document 1, the size of the output block image is restricted by an angle of rotation and the size of the internal cache memory. With a large angle of rotation, the size of the output block image becomes small, increasing the number of accesses to the internal cache memory. This problematically leads to lower CPU processing efficiency for the rotation correction processing and therefore longer processing time. There is another problem that a larger amount of data read for an output block image in a large rotation angle is wasted, increasing the volume of data transfer to the memory for the output block image.

First Embodiment

FIG. 1 is a block diagram of an image processing apparatus 100 according to the present disclosure including a document conveyance apparatus 200. The image processing apparatus 100 has the same basic configuration as a typical copier. The image processing apparatus 100 includes a CPU 101, a scanner 102, an input DMAC 103, a scanner image processing unit 104, a JPEG compressor 105, a JPEG decompressor 106, a skew correction processing unit 107, a printer image processing unit 108, and a main memory 110. The image processing apparatus 100 further includes a printer 109 and the document conveyance apparatus 200. The respective units are connected via a bus 111.

The CPU 101 performs overall control of the image processing apparatus 100. The scanner 102 is a document conveying scanner that conveys and scans an original document to obtain RGB multi-value bitmap image data (a scanned image). The bitmap image data thus obtained is temporarily stored in the main memory 110. The input DMAC 103 denotes an input dynamic memory access controller. The input DMAC 103 reads, from the main memory 110 in units of bands, the RGB bitmap image data to be processed by the scanner image processing unit 104 and supplies the RGB bitmap image data to the scanner image processing unit 104. The scanner image processing unit 104 performs image processing, such as color adjustment, edge enhancement, and scaling, on the scanned RGB multi-value bitmap image data (a scanned image), in units of input bands.

The JPEG compressor 105 performs JPEG compression on processed RGB image data in MCUs, the processed RGB image data being outputted from the scanner image processing unit 104 in units of bands with lines as high as an MCU. The JPEG compressor 105 then outputs the compressed JPEG data to the main memory 110. The MCU denotes a minimum code unit. The JPEG decompressor 106 reads the above-described JPEG data from the main memory 110, decompresses it back into RGB data, and outputs it to the main memory 110 again.

The skew correction processing unit 107 reads, from main memory 110 in units of blocks, image data obtained by JPEG compression or JPEG decompression after being obliquely scanned by the scanner 102. The skew correction processing unit 107 corrects the read image by rotating the image at a given angle and outputs the corrected image data to the main memory 110 in units of blocks.

The printer image processing unit 108 reads the RGB data from the main memory 110 and performs the processing of converting the RGB data into the CMYK color space and the processing of quantization to the converted data. The printer 109 outputs the CMYK data quantized by the printer image processing unit 108 to a printing medium using an inkjet printer. The main memory 110 is an external storage apparatus for temporarily storing the processing results of the above-described units. Typically, the main memory 110 is formed of a dynamic random-access memory (DRAM). As instructed by the CPU 101, the document conveyance apparatus 200 conveys an original document to have the original document scanned by the scanner 102.

Figure 2:
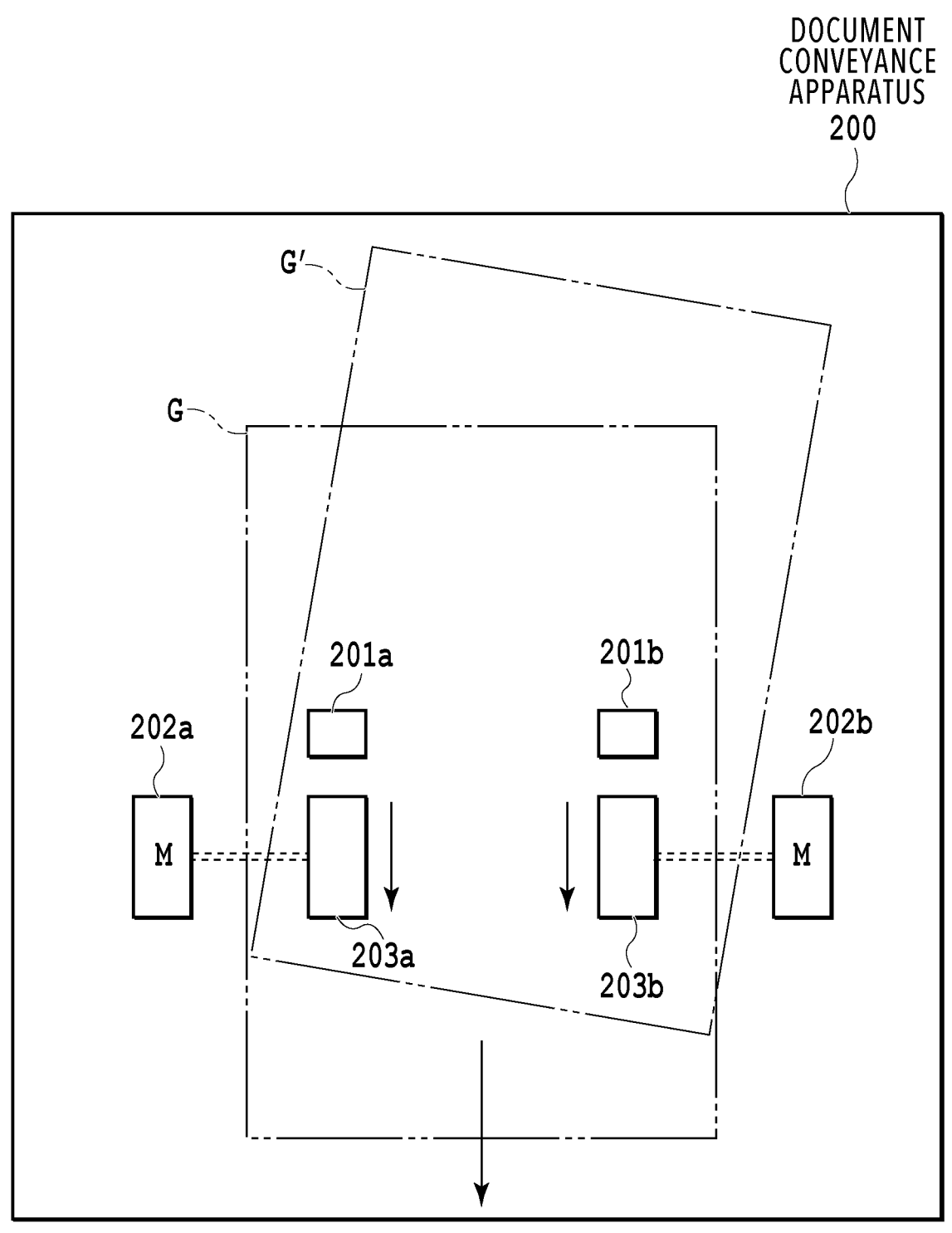
FIG. 2 is a diagram illustrating the need for skew correction processing by a document conveyance apparatus.

FIG. 2 is a diagram illustrating the need of skew correction processing by the document conveyance apparatus 200. The document conveyance apparatus 200 has two sensors 201a, 201b arranged in the width direction, which is a direction orthogonal to the document conveyance direction indicated by the arrow. A pair of conveyance rollers 203a, 203b are coaxially arranged with a predetermined interval in the width direction and are driven by motors 202a, 202b, respectively, to convey an original document G.

Although the original document G should be conveyed in the direction of the arrow, i.e., orthogonally to the shafts of the conveyance rollers, there are cases where an original document skews during conveyance, like an original document G'. In this case, the skew correction processing unit 107 needs to perform skew correction on the original document after conveyance.

Figure 3:
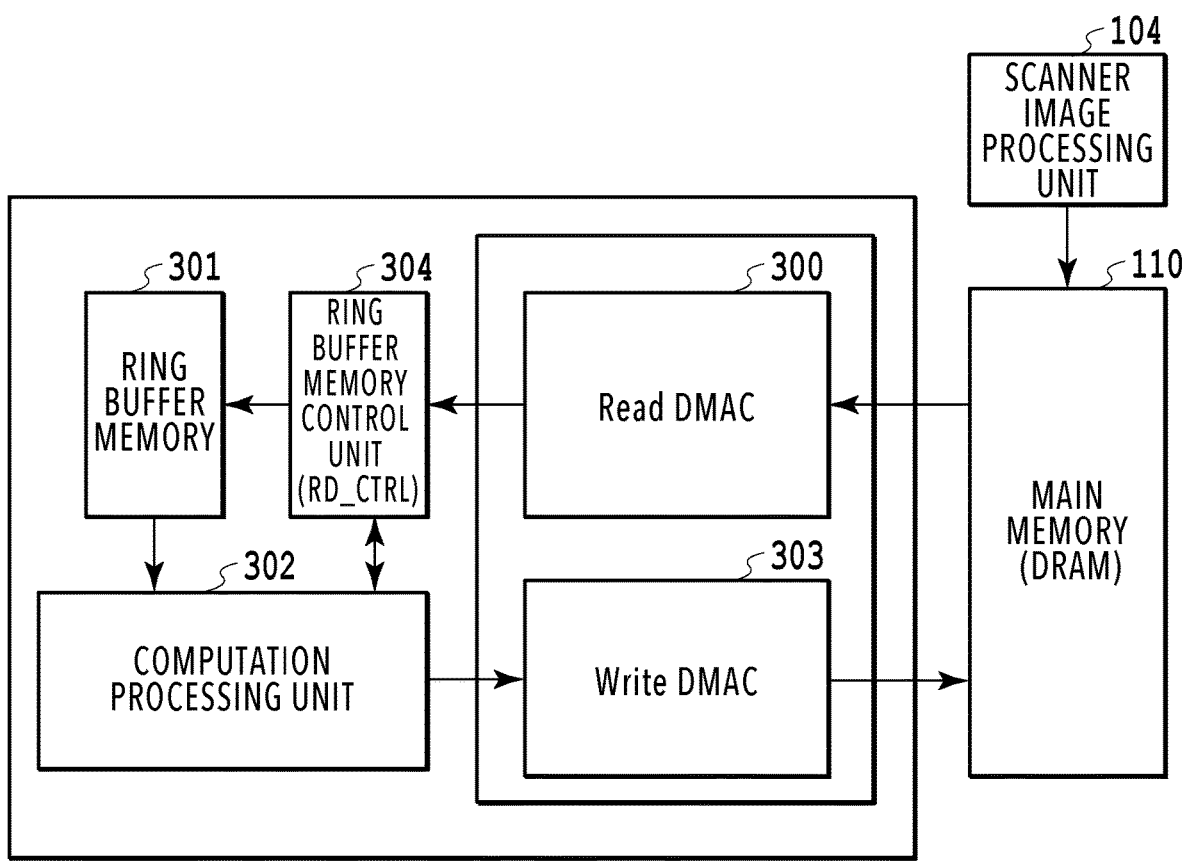
FIG. 3 is a diagram of the configuration of a skew correction processing unit.

FIG. 3 is a diagram of the configuration of the skew correction processing unit 107 in the present embodiment. A read dynamic memory access controller (read DMAC) 300 reads image data from the main memory 110 in units of blocks and supplies the image data to a ring buffer memory 301 described later. This ring buffer memory 301 corresponds to the internal cache memory in Document 1 but does not act as a cache memory.

The ring buffer memory 301 is an internal storage apparatus that holds image data read from the main memory 110. The ring buffer memory 301 is formed of an internal SRAM with a size such that the skew correction processing unit 107 can output a processing result of at least 64 pixels×one line (a minimum of 32 lines, 192 pixels×three bytes (three colors) per line). A computation processing unit 302 is a unit that performs the skew correction. The computation processing unit 302 retrieves image data from the ring buffer memory 301, obtains output image data by performing the skew correction, and supplies the output image data to a write DMAC 303. The write DMAC 303 supplies the output image data obtained by the computation processing unit 302 to the main memory 110 in units of bands. A ring buffer memory control unit (RD_CTRL) 304 is a unit that controls reading and writing of data and manages the storage state of image data in the ring buffer memory 301. Specifically, the ring buffer memory control unit (RD_CTRL) 304 obtains information on the number of lines of the data which has been processed by the computation processing unit 302, newly reads input block data, and writes it into the ring buffer memory 301.

Figure 4:
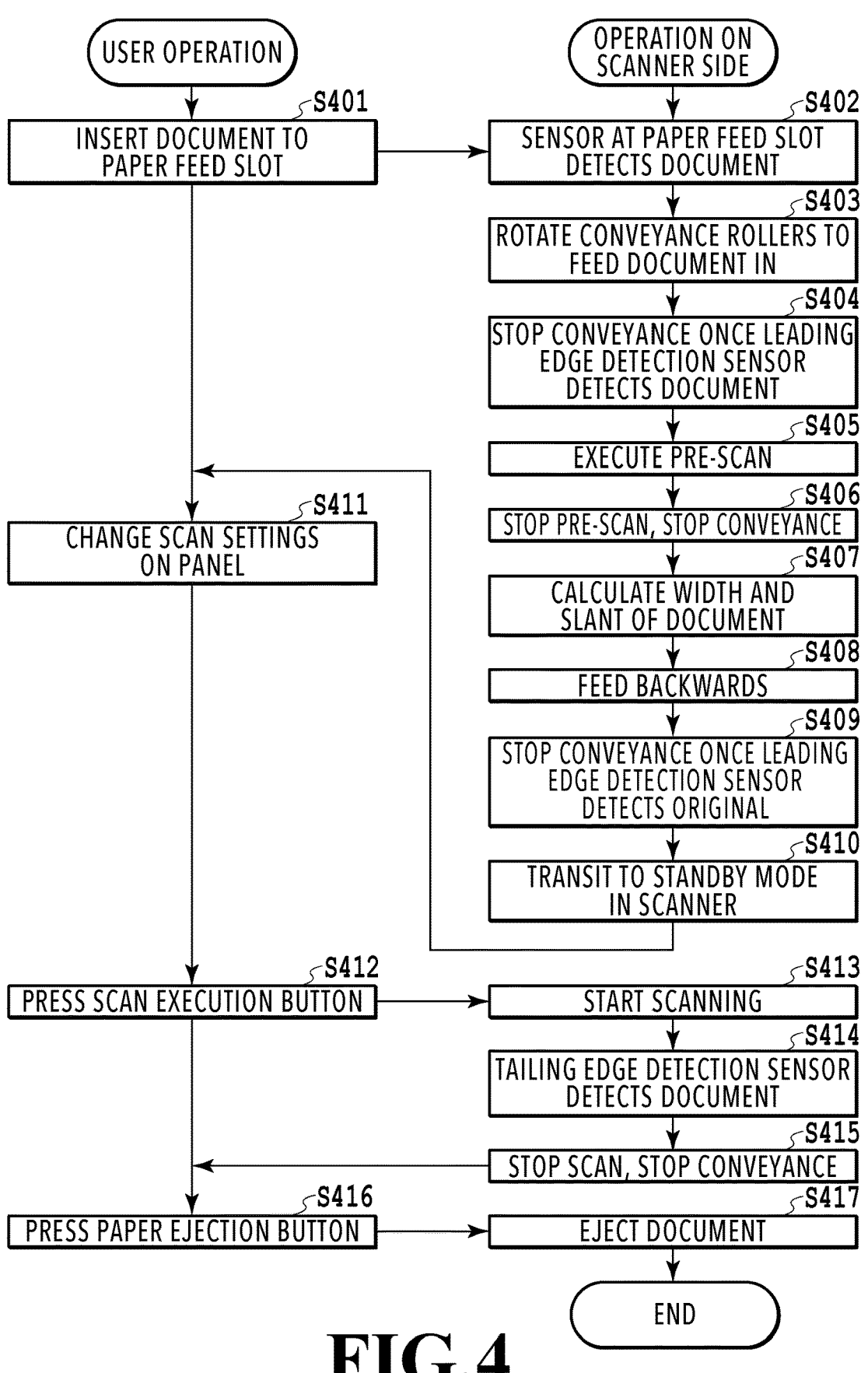
FIG. 4 is a flowchart showing scanning control processing.

FIG. 4 is a flowchart showing scanning control processing in the present embodiment. The flowchart shown in FIG. 4 has two columns for the respective subjects of the operations. In S401, a user inserts the original document into a paper feed slot of the document conveyance apparatus 200, and the processing proceeds to S402. In S402, a sensor at the paper feed slot of the document conveyance apparatus 200 detects the original document, and the processing proceeds to S403. In S403, the pair of conveyance rollers 203a, 203b are rotated to feed the original document, and the processing proceeds to S404. In S404, once a leading edge detection sensor at the scanner 102 detects the leading edge of the original document, conveyance of the original document is stopped, and the processing proceeds to S405. In S405, pre-scan is executed by the scanner 102 with the original document being conveyed, and the processing proceeds to S406. In S406, once a tailing edge detection sensor at the scanner 102 detects the tailing edge of the original document, the scanner 102 stops the pre-scan and also stops the conveyance of the original document, and the processing proceeds to S407. In S407, the CPU 101 performs image analysis on the pre-scan result to detect the edges, calculate the width of the original document and the slant of the original document, and the processing proceeds to S408. In S408, the original document is fed backwards, and the processing proceeds to S409. In S409, once the leading edge detection sensor at the scanner 102 detects the leading edge of the original document, the feeding back of the original document is stopped and the processing proceeds to S410. In S410, the scanner 102 is transited to standby mode, and the processing proceeds to S411.

In S411, the user changes scan settings using an operation panel, and the processing proceeds to S412. In S412, the user presses a button to execute scanning. Once the scan execution button is pressed, the processing proceeds to S413. In S413, while the scanner 102 again scans the original document slanted due to skew, the JPEG compressor 105 performs JPEG compression, and the compressed data is stored in the main memory 110. After the compression data is read and decompressed by the JPEG decompressor 106, the skew correction processing unit 107 performs skew correction, and the processing proceeds to S414. In S414, once the tailing edge detection sensor at the document scanner 102 detects the tailing edge of the original document, the processing proceeds to S415. In S415, the scanner 102 stops scanning and also stops conveyance of the original document, and the processing proceeds to S416. In S416, the user presses a button to eject the paper. Once the paper ejection button is pressed, the processing proceeds to S417. In S417, the original document is ejected from the scanner 102, and the processing in the flowchart shown in FIG. 4 ends. At this point, a skew-corrected image is stored in the main memory 110.

Figures 5A, 5B:
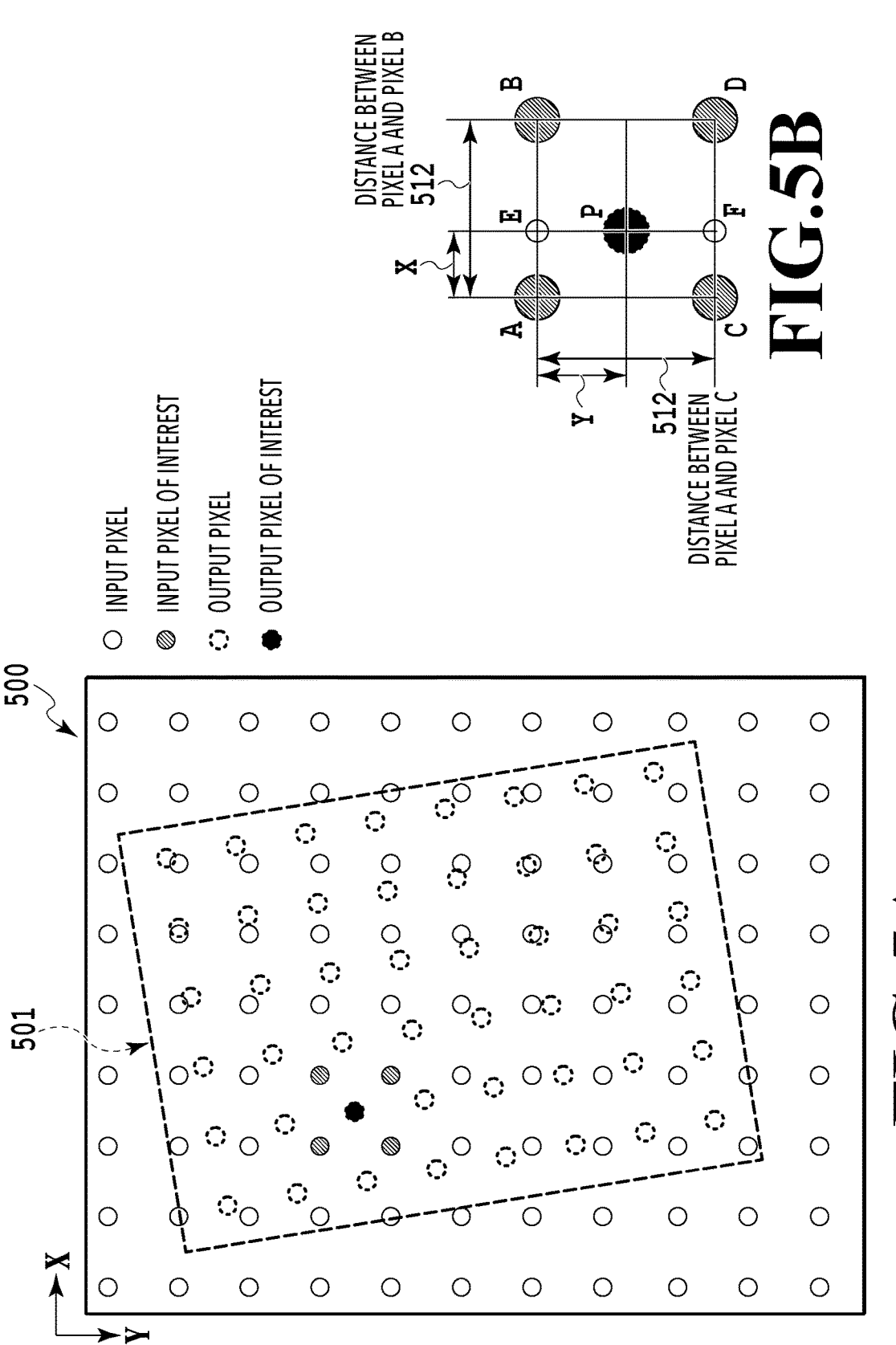
FIGS. 5A and 5B are diagrams illustrating rotation control processing by the skew correction processing unit.

FIGS. 5A and 5B are diagrams illustrating rotation control processing by the skew correction processing unit 107 in the present embodiment. FIG. 5A is a diagram showing a concept in which the skew correction processing unit 107 performs rotation processing between input values and output values. FIG. 5B is a conceptual diagram showing pixel calculations in more detail.

As shown in FIG. 5A, pixels of an output image 501 are disposed inside an input image 500, and the value of each of the disposed output pixels is calculated based on the values of input pixels surrounding the position of the output pixel. After the output value of one pixel to be outputted is calculated by the algorithm to be described below, the position of the next output pixel adjacent to the above output pixel is calculated, and the position of that next output pixel is calculated similarly based on the values of the surrounding input pixels. This is repeated for all the output pixels.

The value of an output pixel is calculated based on the values of and the distances from four pixels surrounding the disposed output pixel. FIG. 5B shows an output pixel of interest (output pixel to be calculated) as P and input pixels of interest (input pixels surrounding the output pixel of interest) as A, B, C, and D. A virtual pixel existing on a straight line AB and having the same X-coordinate as the output pixel of interest P is E, and a virtual pixel existing on a straight line CD and having the same X-coordinate as the output pixel of interest P is F. The pixel value of the virtual pixel E is calculated by linear interpolation between A and B, and the pixel value of the virtual value F is calculated by linear interpolation between C and D. Then, the pixel value of the output pixel of interest P is calculated by linear interpolation between E and F. Coordinate positions used for the linear interpolation are computed at a 9-bit accuracy, and the virtual pixels E and F, which are pixel values used for computation, are computed at a 12-bit accuracy. A pixel value PV(P) of the output pixel of interest P is computed using Expression (1) to (6) below.

$$PV(E(12 \text{ bits})) = (PV(A) << 4) + ((X * (PV(B) - PV(A)) + 16) >> 5), \quad (1)$$

$$\text{in a case where } (PV(B) \geq PV(A))$$

$$PV(E(12 \text{ bits})) = (PV(A) << 4) - ((X * (PV(A) - PV(B)) + 16) >> 5), \quad (2)$$

$$\text{in a case where } (PV(B) < PV(A))$$

$$PV(F(12 \text{ bits})) = (PV(C) << 4) + ((X * (PV(D) - PV(C)) + 16) >> 5), \quad (3)$$

$$\text{in a case where } (PV(D) \geq PV(C))$$

$$PV(F(12 \text{ bits})) = (PV(C) << 4) - ((X * (PV(C) - PV(D)) + 16) >> 5), \quad (4)$$

$$\text{in a case where } (PV(D) < PV(C))$$

$$PV(P(8 \text{ bits})) = \quad (5)$$

-continued
$$(PV(E) + ((Y * (PV(F) - PV(E)) + 256) >> 9) + 8) >> 4,$$

$$\text{in a case where } (PV(F) \geq PV(E))$$

$$PV(P(8 \text{ bits})) = \quad (6)$$

$$(PV(E) - ((Y * (PV(E) - PV(F)) + 256) >> 9) + 8) >> 4,$$

$$\text{in a case where } (PV(F) < PV(E))$$

In the above expressions, "$<<$" indicates a left-shift operator, and "$>>$" indicates a right-shift operator.

Also, X represents the distance between A and E or between C and F in a case where the distance between A and B is 512, and Y is the distance between E and P in a case where the distance between A and C is 512. PV(A), PV(B), PV(C), and PV(D) are the pixel values of the input pixels of interest A, B, C, and D, respectively. Also, "+16" in Expressions (1) to (4) and "+8" in Expressions (5) and (6) are offsets for rounding performed in bit shifting.

Figure 6A:
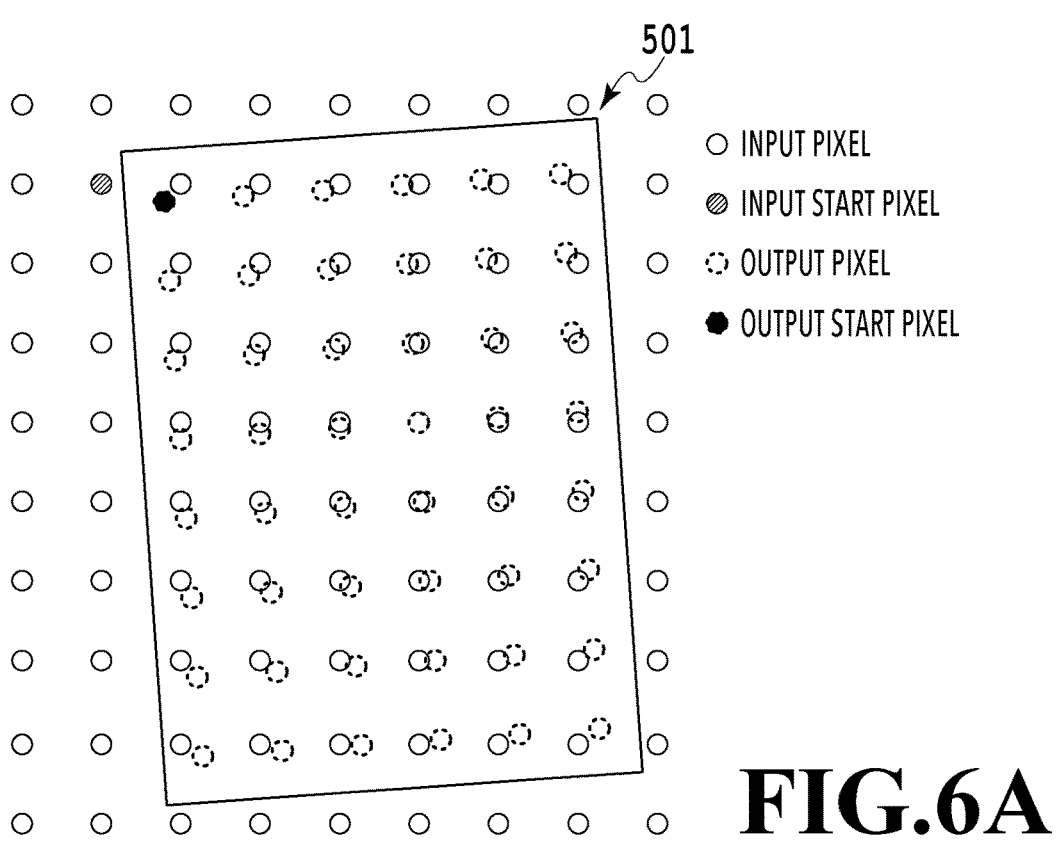
FIGS. 6A, 6B, and 6C are diagrams illustrating a processing start position and an amount of rotation for the skew correction processing unit.
Figure 6B:
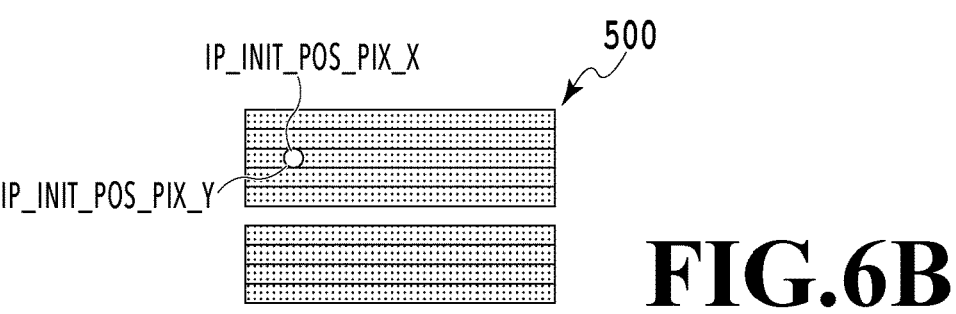
Figure 6C:
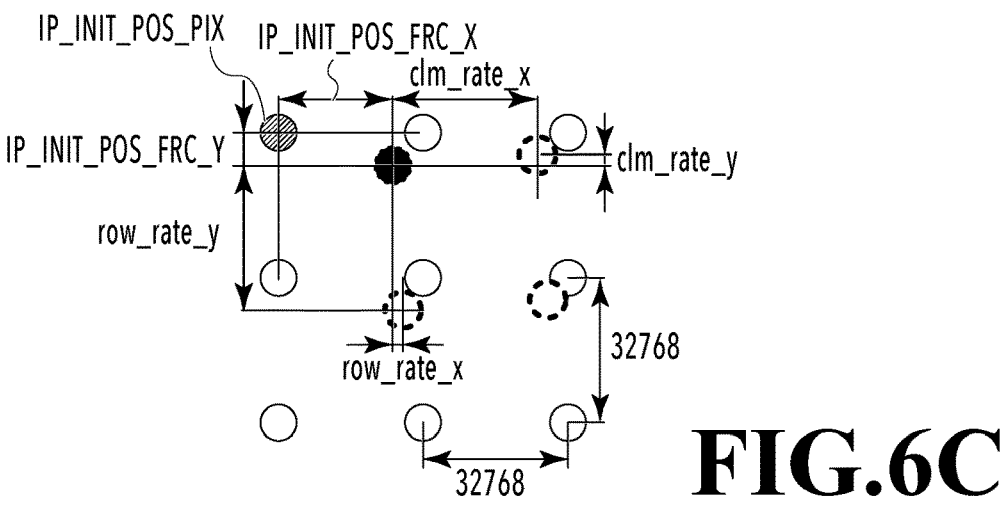

Next, with reference to FIGS. 6A, 6B, and 6C, a description is given of a processing start position for the skew correction processing unit 107. FIG. 6A is a conceptual diagram showing the positions of an input start pixel and an output start pixel for the skew correction processing unit 107. In FIG. 6A, the dot "." at the upper left of the output image 501 indicates an output start pixel, and an input start pixel is depicted at the upper left to the output start pixel. FIG. 6B is a diagram for specifying the position of an input start pixel relative to the output start pixel in FIG. 6A in a case where an input image is managed in the main memory 110. In FIG. 6B, the position of an input start pixel relative to the output start pixel is specified by IP_INIT_POS_PIX_Y indicating which line it is in the input image 500 and IP_INIT_POS_PIX_X indicating which pixel it is from the left of that line.

Here, an output start pixel is the pixel at the upper left end of an output band, and an input start pixel is the upper left one of the four input pixels surrounding the position of the output start pixel. Also, the input image and the output image are managed as a page memory in the main memory 110. Position specifying values use the origin as their start points. To specify the first pixel of the first line of an input image as an output start pixel position, IP_INIT_POS_PIX_Y=0, and IP_INIT_POS_PIX_X=0.

FIG. 6C is a diagram showing the amount of displacement of an output start pixel position from a specified input start pixel position by less than one pixel. The amount of displacement of an output start pixel position from a specified input start pixel position by less than one pixel is indicated by IP_INIT_POS_FRC_X and IP_INIT_POS_FRC_Y with the interval of one pixel in an input image being specified in the range from 0 to 32767 ($=2^{15}-1$). The symbol "^" represents exponentiation.

Next, specification of the amount of rotation is described with reference to FIG. 6C. FIG. 6C is a conceptual diagram showing pixel calculation in more detail. For specification of the amount of rotation and scaling, in a case where an output pixel is moved in the X-direction or Y-direction by one pixel, the amounts of movement in the X-direction and the Y-direction in the input image are specified. In a case where an output pixel is moved in the X-direction by one pixel, the amounts of movement in the X-direction and the Y-direction in the input image are specified with clm_rate_x and clm_rate_y, respectively. In a case where an output pixel is moved in the Y-direction by one pixel, the amounts of movement in the X-direction and the Y-direction in the input image are specified with row_rate_x and row_rate_y, respectively.

Also, the sign (positive or negative) of the direction of movement in the Y-direction in the input image in a case where the output pixel is moved in the X-direction is specified with clm_rate_flag (0 for the positive sign and 1 for the negative sign). The sign (positive or negative) of the direction of movement in the X-direction in the input image in a case where the output pixel is moved in the Y-direction is specified with row_rate_flag (0 for the positive sign and 1 for the negative sign).

In a case where the main scanning direction of the output image forms a positive angle relative to the main scanning direction of the input image (i.e., the output image is slanted leftwards relative to the input image) as shown in FIG. 6A, clm_rate_flag=1, and row_rate_flag=0. In a case where the main scanning direction of the output image forms a negative angle relative to the main scanning direction of the input image (i.e., the output image is slanted rightwards relative to the input image), clm_rate_flag=0, and row_rate_flag=1. Hereinafter, the former is called as positive rotation, and the latter is called as negative rotation.

The amounts of movement clm_rate_x, clm_rate_y, row_rate_x, and row_rate_y are each specified using a distance where the interval of one pixel is divided equally by 32768 $(2^{\wedge}15)$. In a case where $(\text{clm\_rate\_x}^{\wedge}2)+(\text{row\_rate\_x}^{\wedge}2)=(32768^{\wedge}2)$ and $(\text{clm\_rate\_y}^{\wedge}2)+(\text{row\_rate\_y}^{\wedge}2)=(32768^{\wedge}2)$, the scale of the output image is the same as that of the input image. By changing the sum of these from $(32768^{\wedge}2)$, it is also possible to perform processing of rotation and scaling (enlarging or reducing) at the same time.

Figures 7A, 7B:
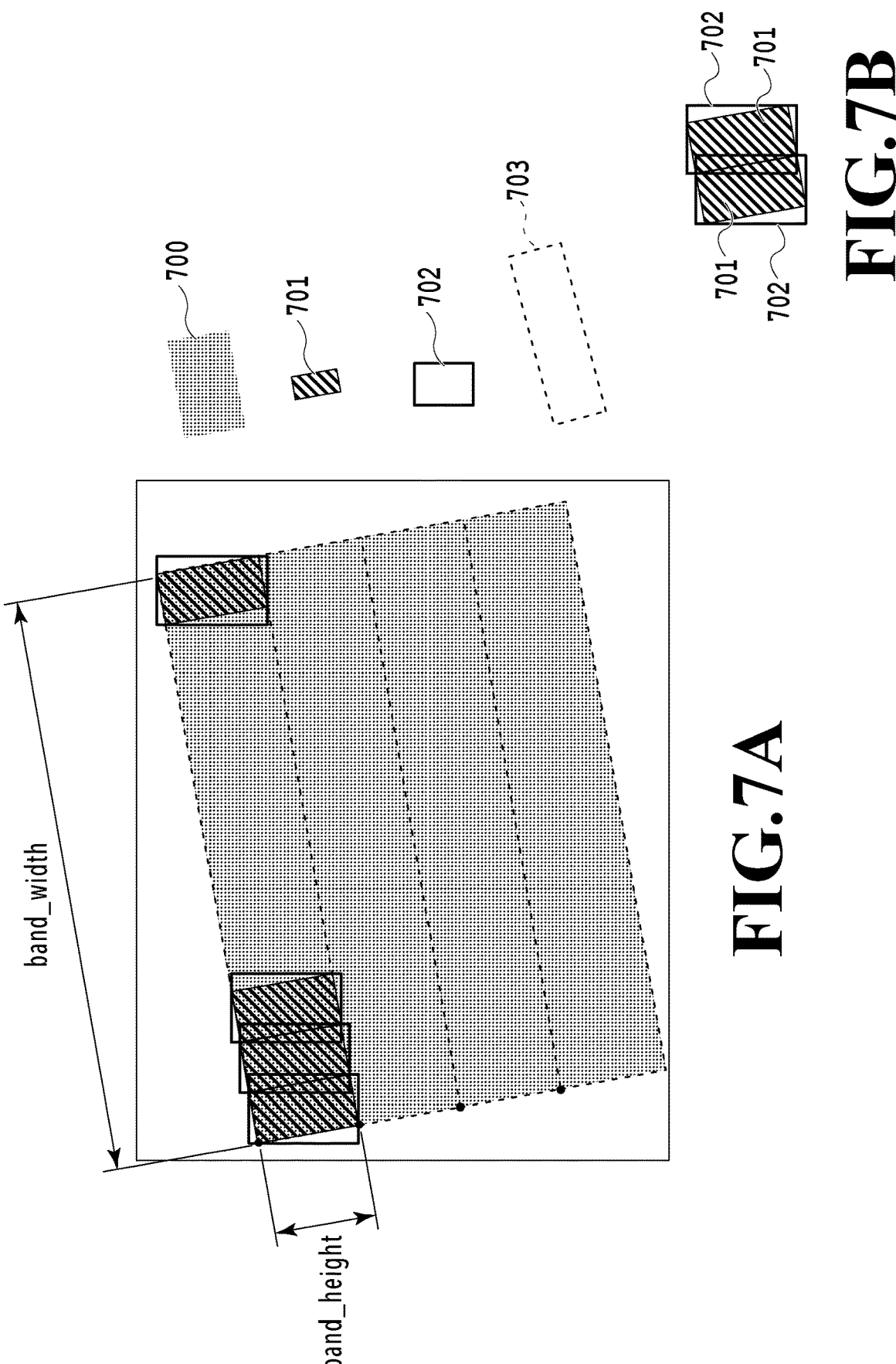
FIGS. 7A and 7B are diagrams showing an activation unit of processing by the skew correction processing unit.

FIG. 7A is a diagram showing a unit of activation of each process by the skew correction processing unit 107 in the present embodiment. A region 700 shown in FIG. 7A represents image data on the entire input page stored in the main memory 110. Regions 701 shown in FIG. 7A represent the positions, in the input image, of image data on output blocks into which an output image is divided. The height of each output block is a value set in band_height, and the width of each output block is a value set in band_width (divided blocks are in units of 64 pixels). Regions 702 shown in FIG. 7A are each an input-block region that a read DMAC 801 to be described later reads from the main memory 110 and writes into the ring buffer memory 301 in order to process the image data inside the corresponding region 701. Note that the region 702 needs to be set to encompass the corresponding region 701 (output block), as shown in FIG. 7B. Regions 703 shown in FIG. 7A are output image data in units of bands each formed by connecting a plurality of the regions 702 (output band image data).

The skew correction processing unit 107 reads an input block image in units of output blocks, performs rotation processing on the input block image, and then outputs an image according to raster order in the output block. After completion of processing for one block, the same processing is performed on the next input block, and once output of the rightmost output block of the output image is completed (once output of the last output block of one band is completed), processing is temporarily stopped.

After that, processing for the next band is started once an input image which enables output of the next output band is read. After processing of all the bands is completed, an output image for one page is obtained.

Figure 8:
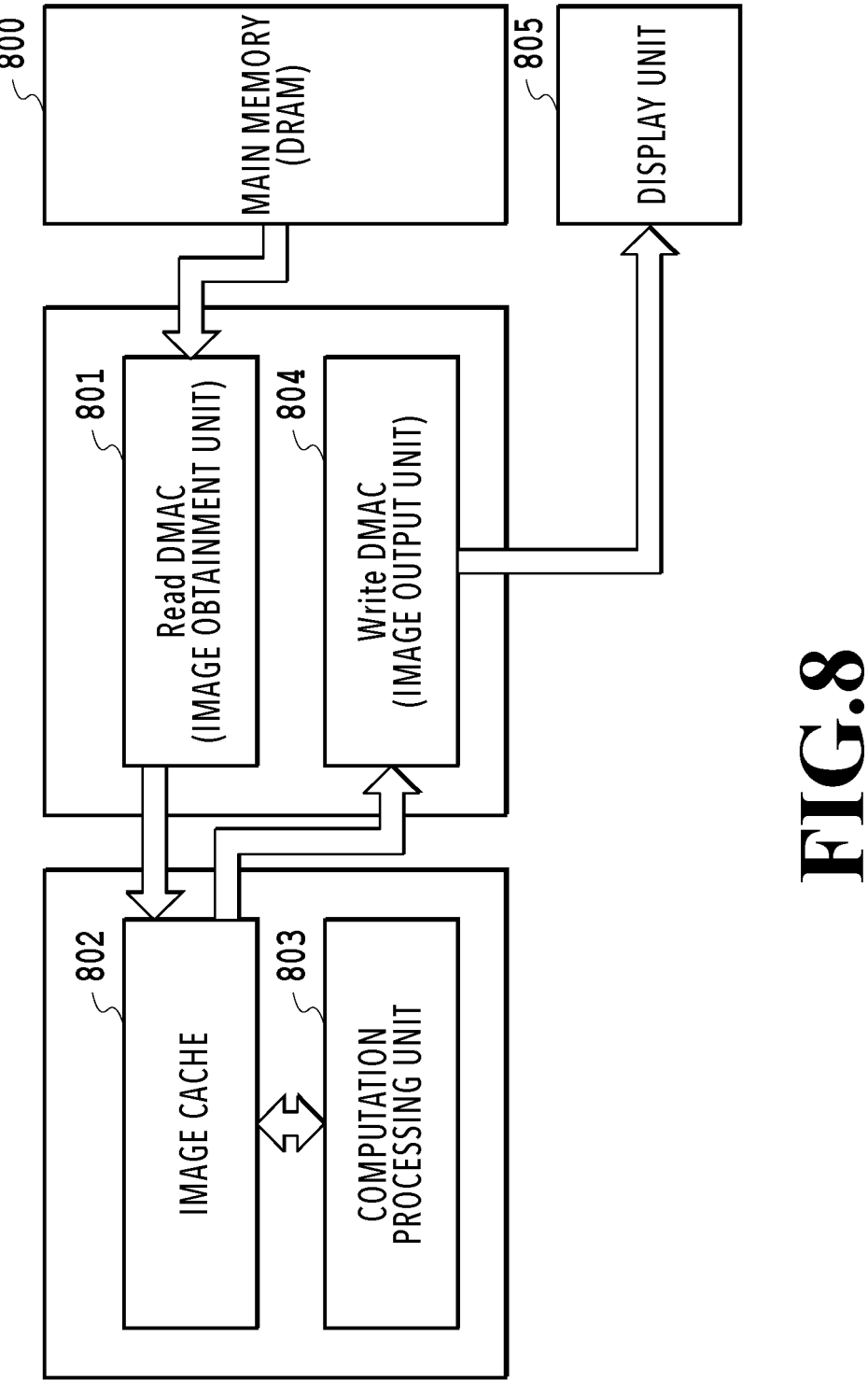
FIG. 8 is a diagram illustrating a configuration of prior art.

FIG. 8 is a diagram illustrating the configuration of a skew correction processing unit in prior art shown in Document 1.

A main memory 800 is a memory for temporarily saving results of processing by the units. A DRAM is typically used as the main memory 800.

The read DMAC 801 reads image data from the main memory 800 in units of blocks and supplies part of the image data to an image cache 802. The image cache 802 is a cache for holding image data read from the main memory 800 and output image data outputted from a computation processing unit 803. The image cache 802 stores a block with a shape having a set number of pixels in height and a set number of pixels in width in an input image. The image cache 802 is formed of one or more blocks. The image cache 802 reads image data from the main memory 800 in units of blocks and holds them. Similarly, the image cache 802 holds output image data outputted from the computation processing unit 803 as well. The computation processing unit 803 is a unit for performing skew correction. The computation processing unit 803 reads image data from the image cache 802, performs skew correction thereon, and returns output image data to the image cache 802. A write DMAC 804 supplies the output image data outputted from the image cache 802 to a display unit 805 in units of blocks. The display unit 805 displays image data obtained as a result of the skew correction processing.

Figure 9A:
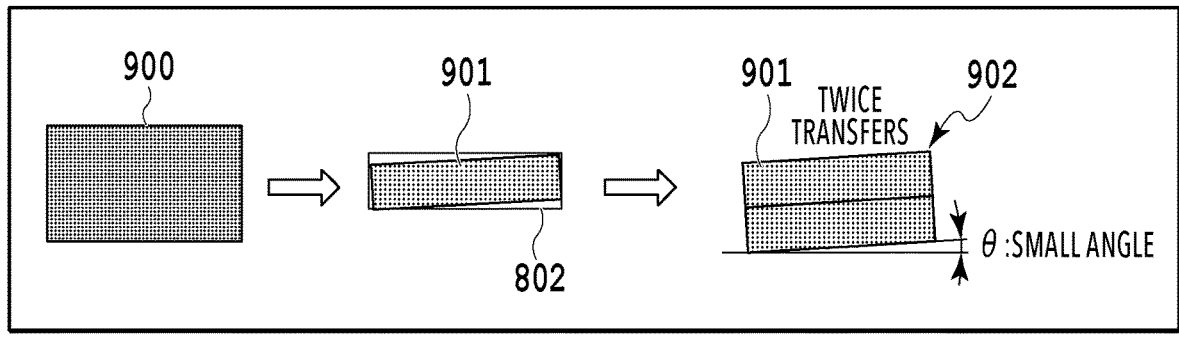
FIGS. 9A, 9B, 9C, and 9D are diagrams illustrating units of an input block and an output block in the configuration of prior art.
Figure 9B:
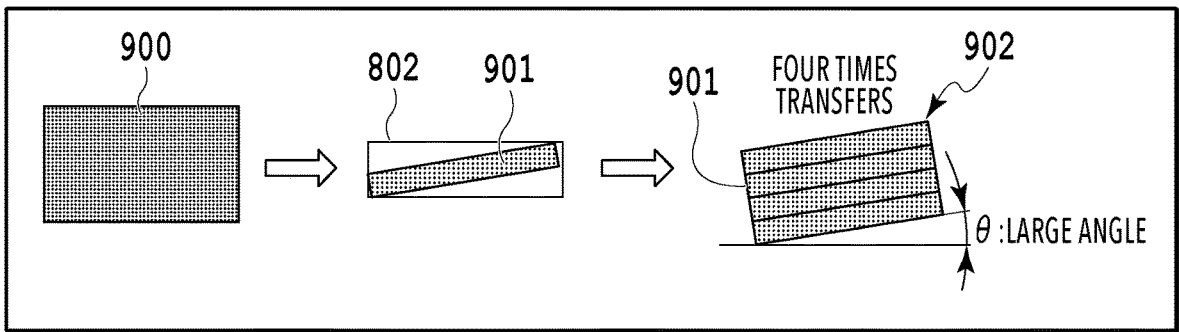

With the technique in Document 1, since the size of an output block is restricted by an angle of rotation and image cache size, the following problems shown in FIGS. 9A, 9B, 9C, and 9D are existed. FIGS. 9A, 9B, 9C, and 9D are diagrams illustrating the units of an input block and an output block according to the configuration of the prior art. FIG. 9A is a diagram showing the size of an output block and the number of transfers in a case where an input image is rotated by a small angle. FIG. 9B is a diagram showing the size of an output block and the number of transfers in a case where an input image is rotated by a large angle.

A region 900 denotes an input image. A region 901 denotes an output block. The region 901 is encompassed by the image cache 802. A region 902 denotes an output image. In FIGS. 9A and 9B, in the configuration of the prior art, an output block (the region 901) is generated according to the size of the image cache 802 denoted by the region 902, and this processing is repeated in units of blocks to output an output image denoted by the region 902.

In a case where the rotation angle is small as shown in FIG. 9A, the image data can be processed with only twice transfers. However, in a case where the rotation angle is large as shown in FIG. 9B, the size of the output block (denoted by the region 901) that fits inside the image cache 802 is smaller because the size of the input block corresponds to the size of the image cache 802. Thus, the image data needs to be processed with four times transfers, which is more than the case in FIG. 9A.

As a result, in a case of a large rotation angle, the image region processed by the CPU at a time is small, which problematically makes the processing time longer. Conversely, in order to shorten the processing time, the cache size of the image cache 802 needs to be increased, which leads to increased costs for the apparatus.

Figure 9C:
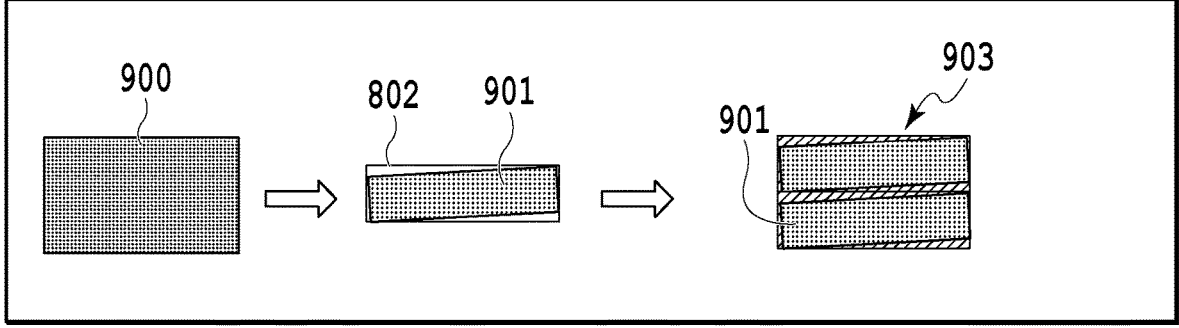

FIG. 9C is a diagram showing a total amount of reading 903 of input blocks for output blocks in a case where an input image is rotated by a small angle. To output the output block denoted by the region 901, the image cache 802 corresponding the size of the cache surrounding the output block needs to be read. In the case of FIG. 9C, which has a small rotation angle, processing can be done with a small number of output blocks.

Figure 9D:
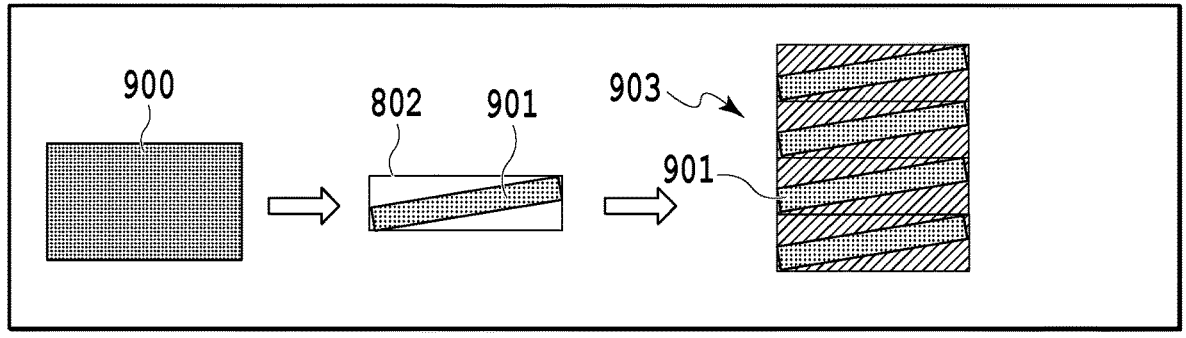

FIG. 9D is a diagram showing the total amount of reading 903 of input blocks for output blocks in a case where an input image is rotated by a large angle. As shown in FIG. 9D, with a large angle of rotation, a smaller output block fits in the cache size, which means more output blocks. As a result, the total amount of reading 903 needed to obtain the same output page increases in proportion to the number of output blocks. For this reason, this leads to a problem that the amount of data transferred to the main memory increases.

In the present embodiments, the configuration shown in FIG. 3 is newly employed to solve the problems described above. The new configuration according to the present embodiment includes the main memory 110, the read DMAC 300, the ring buffer memory 301, the computation processing unit 302, the write DMAC 303, and the ring buffer memory control unit (RD_CTRL) 304.

The main memory 110 (DRAM) stores unrotated input image data and rotated output image data. The read DMAC 300 reads input image data from the main memory 110 in units of blocks, and writes them into the ring buffer memory 301. The ring buffer memory 301 (internal SRAM) temporarily stores image data read from the main memory 110. The computation processing unit 302 performs image rotation processing on image data stored in the ring buffer memory 301. The write DMAC 303 writes output image data obtained by the computation processing unit 302 into the main memory 110 in units of blocks. The ring buffer memory control unit (RD_CTRL) 304 writes input image data read by the read DMAC 300 into the ring buffer memory 301. Also, as needed, the ring buffer memory control unit (RD_CTRL) 304 performs control so that input image data which is no longer needed after the processing by the computation processing unit 302 can be overwritten in the ring buffer memory 301.

The ring buffer memory 301 is an internal SRAM for storing an input block in units of lines in the form of a ring buffer and has a size such that at least one line of an output block (64 pixels in the present embodiment) can be outputted in a case where the rotation angle is maximum and the scaling factor is minimum.

The height (vertical) size of an output block is variable according to the rotation angle and the scaling factor. Also, the width (horizontal) size of an input block is variable according to the rotation angle, the scaling factor, and the vertical and horizontal sizes of an output block.

Making the ring buffer memory 301 variable according to the vertical and horizontal sizes of the input and output blocks as described above makes it possible to reduce the number of times processing and in turn reduce the amount of data transferred to the main memory. Thus, the vertical and horizontal sizes of the input and output blocks can be determined considering the actual memory size. Also, the vertical and horizontal sizes of the input and output blocks can be selected considering the balance between the amount of data transferred to the main memory and image processing time.

Using FIGS. 10, 11A to 11C, 12A to 12F, 13A to 13F, and 14A to 14B, the following describes the operation of the ring buffer memory control unit (RD_CTRL) 304 and the internal operation of the skew correction processing unit 107 according to the present embodiment.

Figure 10:
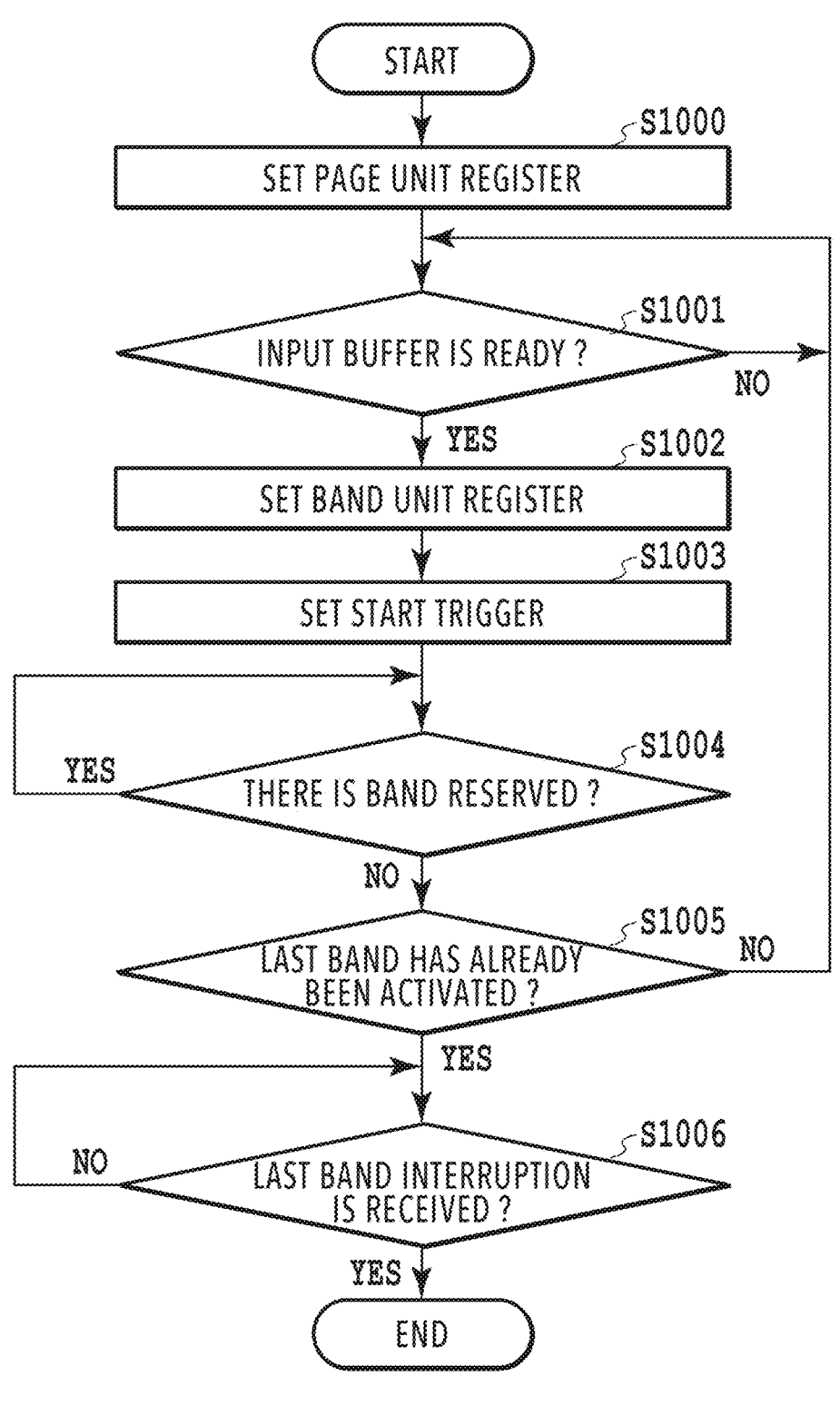
FIG. 10 is a flowchart showing an internal operation of the skew correction processing unit.

FIG. 10 is a flowchart showing the internal operation of the skew correction processing unit 107 of the present embodiment. Once processing starts, in S1000, the skew correction processing unit 107 sets a value to use for a page unit. In other words, the skew correction processing unit 107 sets a page unit register. After completion of the page unit register, the processing proceeds to S1001.

In S1001, the skew correction processing unit 107 determines whether there is enough space remained in the input/output buffer. The determination of whether there is enough space remained in the input/output buffer is made based on whether the number of input buffer storage lines is equal to or greater than the height of an input band of the input data and whether the number of output buffer available lines is equal to or greater than the height of the output buffer.

In a case where it is determined in S1001 that there is enough space in the input/output buffer, the processing proceeds to S1002. In a case where there is not enough space in the input/output buffer, the processing in S1001 is repeated until the space available in the input/output buffer satisfies the above-described determination criteria. Specifically, the processing in S1001 is repeated until space becomes available in the input/output buffer as a result of the skew correction processing unit 107 performing computation processing for skew correction.

In S1002, the skew correction processing unit 107 sets a value to use for a band unit. In other words, the skew correction processing unit 107 sets a band unit register. After the skew correction processing unit 107 configures intended settings, the processing proceeds to S1003. In S1003, the skew correction processing unit 107 sets a start trigger to start computation for skew correction, and the processing proceeds to S1004.

Because additional processing can be performed on another band in a case where there is any space left in the input/output buffer, during computation for skew correction, in S1004, the skew correction processing unit 107 checks whether the next band can be activated. In a case where the skew correction processing unit 107 cannot activate the next band, the processing proceeds to S1005. In a case where the processing for the next band has not been completed yet, the skew correction processing unit 107 waits until the processing for the next band is completed.

In S1005, the skew correction processing unit 107 determines whether data on the last band has been activated. In a case where the skew correction processing unit 107 determines that data on the last band has been activated, the processing proceeds to S1006. In a case where the skew correction processing unit 107 determines that data on the last band has not been activated yet, the processing proceeds back to S1001.

In a case where the skew correction processing unit 107 does not receive, in S1006, a last band interruption indicating that processing on the last band has been completed, the processing in S1006 is repeated. Once the skew correction processing unit 107 receives a last band interruption, the processing in the flowchart shown in FIG. 10 ends.

Figure 11A:
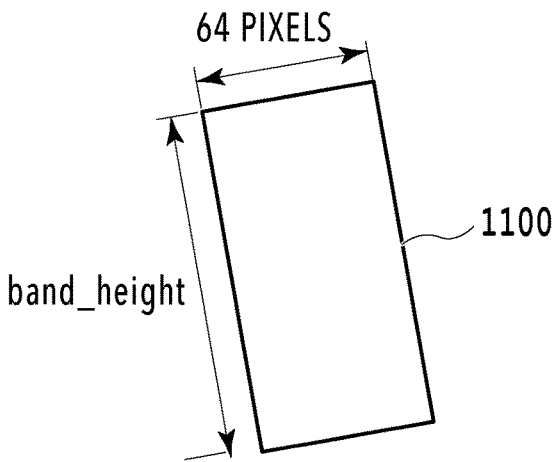
FIGS. 11A, 11B, and 11C are diagrams illustrating the configuration of an internal SRAM.
Figure 11B:
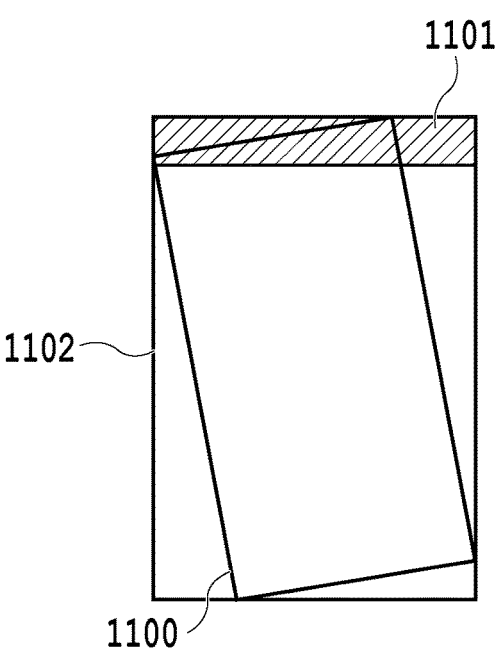
Figure 11C:
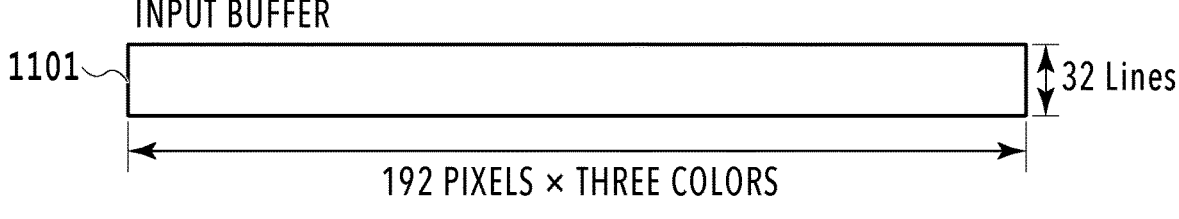

FIGS. 11A, 11B, and 11C are diagrams illustrating the configuration of the ring buffer memory 301. As shown in FIG. 11A, the skew correction processing unit 107 performs processing in units of output block data 1100 with the following size. The size of the output block data 1100 is such that the horizontal (width) size is what a region 704 (an output band) in FIG. 7A is divided in units of 64 pixels in the main scanning direction and the vertical (height) size is the size of the height of an output band set in band_height. The skew correction processing unit 107 performs processing in units of the output block data 1100 created. The output block data 1100 corresponds to the region 702 in FIG. 7A. Thus, the skew correction processing unit 107 writes input block data 1102 including the output block data 1100 from the main memory 110 into the ring buffer memory 301. The input block data 1102 is a block outside a region 1101 shown in FIG. 11B and corresponds to the region 703 in FIG. 7A.

The computation processing unit 302 reads pixel values of the input image from the ring buffer memory 301 and calculates output pixel values one pixel at a time according to the raster order of the output block data 1100. Also, the ring buffer memory 301 has prepared therein an internal SRAM with a size (the region 1101) such that one or more lines with 64 pixels in width can be outputted in a case where the supportable angle is 10° at maximum and band_height is 128 lines, which is the maximum value. Also, as shown in FIG. 11C, the region 1101 has a size such that output of one line can be started in a case where the input block data 1102 is read from the ring buffer memory 301 according to the raster order. In other words, the region 1101 indicates the minimally needed amount of the ring buffer memory 301. In the example in FIG. 11C, image data (partial image data) on three colors with the size of 32 lines vertically and 192 pixels horizontally can be stored in the region 1101.

FIGS. 12A to 12F are diagrams illustrating the operations of the ring buffer memory control unit (RD_CTRL) 304 and the ring buffer memory 301. To output the entire output block data 1100, the entire input block data 1102 needs to be read. However, there is no need to store the entire input block data 1102 in the ring buffer memory 301 at the same time, and overwriting can be done as needed in accordance with output processing.

FIGS. 12A to 12F show processing performed in a case where processing within a block has an angle of rotation of 0° or greater (the main scanning direction of the output image forms a positive angle to the main scanning direction of the input image, i.e., the output image is slanted leftwards from the input image).

Figure 12A:
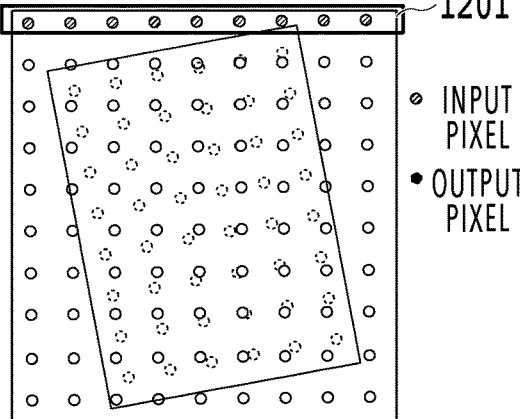
FIGS. 12A to 12F are diagrams illustrating the operation of the internal SRAM (in ring buffer form)
Figure 12B:
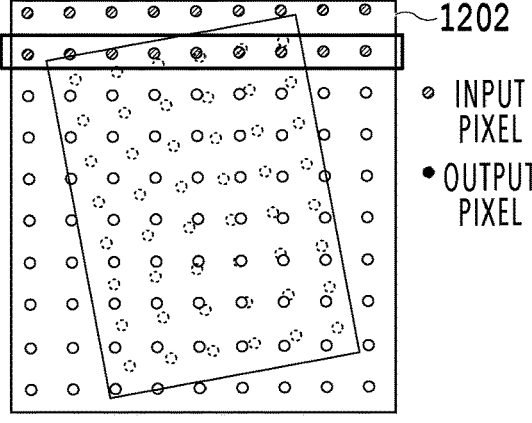
Figure 12C:
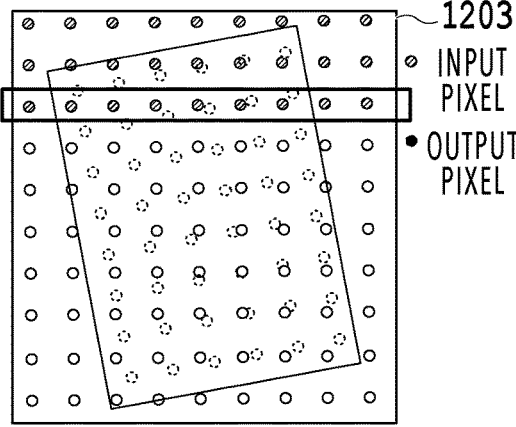

In a case where an angle of rotation is 0° or greater (positive rotation), as shown in FIGS. 12A to 12C, the input data is read from the main memory 110 in units of lines until the leftmost output pixel on one line becomes processible.

Figure 12D:
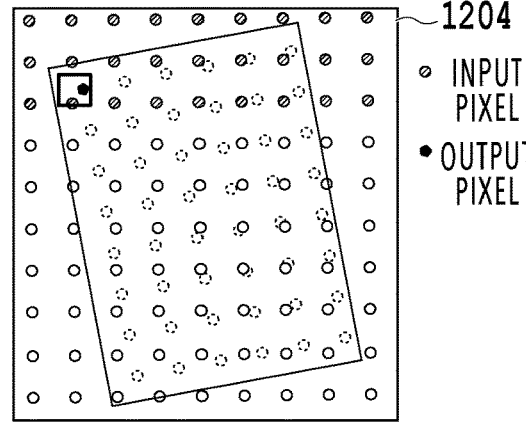

The output pixel at the left end of one line is the "lowermost" pixel of the input block. As shown in FIG. 12C, the read DMAC 300 reads the input data from the main memory 110 until all the lines in the input image containing the position of this output pixel are stored in the ring buffer memory 301. After that, the value of the output pixel at the left end is calculated by the computation processing unit 302 and is outputted by the write DMAC 303 to the main memory 110 as shown in FIG. 12D.

Figure 12E:
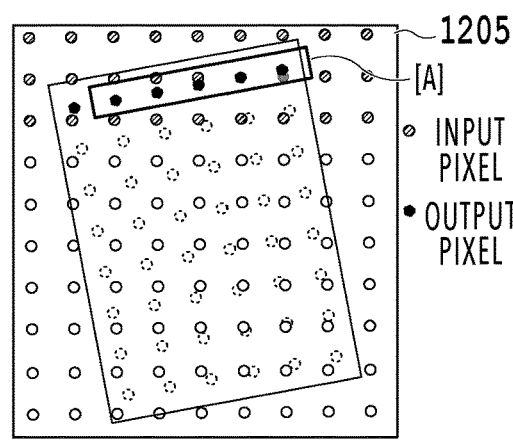

After the first output pixel is outputted, all of the four pixels surrounding each of the pixels in the output line are in the ring buffer memory 301. Thus, processing is performed on the one output line, and as shown in FIG. 12E, the rest of the pixels in the one line are outputted to the main memory 110.

In a case where the angle of rotation is positive, the rightmost pixel of an output line is the "uppermost" pixel of the input block, and in order to output the rightmost pixel, the values of pixels in the input block that are one line above the position of the rightmost pixel are necessary. After the processing on one line is completed, as shown in FIG. 12E, the computation processing unit 302 calculates "the Y-coordinate (in the input image) of the upper end [A] on the line after the one outputted." As a result of this calculation, as shown in FIG. 12F, it is determined that the input line [B] is unnecessary.

Figure 12F:
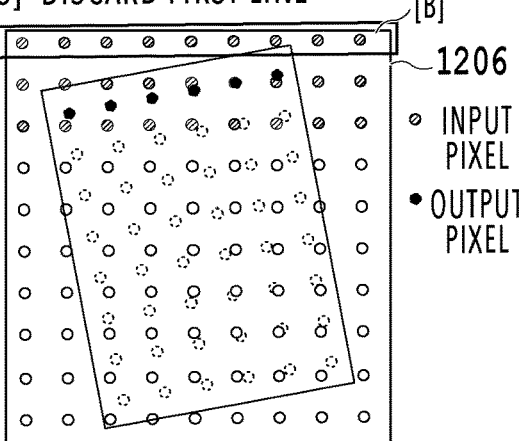

As shown in FIG. 12F, the ring buffer memory control unit (RD_CTRL) 304 obtains the number of input lines which are no longer necessary for the computation by the computation processing unit 302 and makes those lines overwritable by sequentially discarding the image data on those lines in the ring buffer memory 301. After that, the input data is sequentially stored from the main memory 110 into the ring buffer memory 301 until rotation processing can be performed on the next line.

FIGS. 13A to 13F show processing performed in a case where processing within a block has an angle of rotation of 0° or less (the main scanning direction of the output image forms a negative angle to the main scanning direction of the input image, i.e., the output image is slanted rightwards from the input image).

Figure 13A:
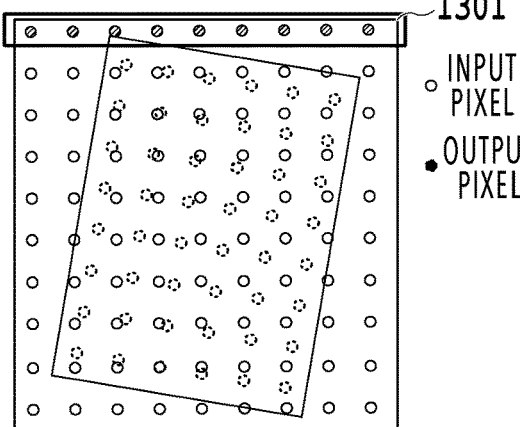
FIGS. 13A to 13F are diagrams illustrating the operation of the internal SRAM (in ring buffer form)
Figure 13B:
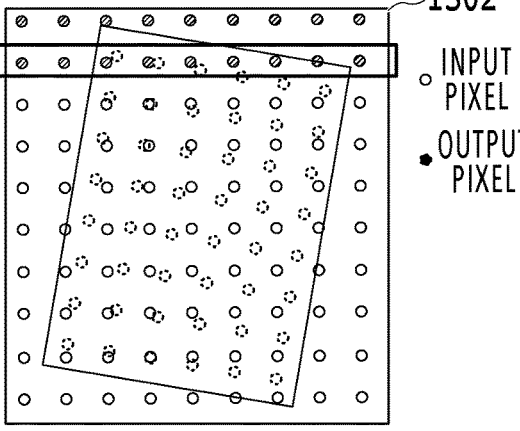
Figure 13C:
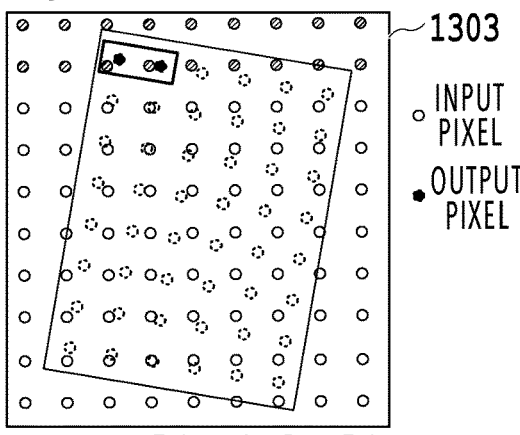
Figure 13D:
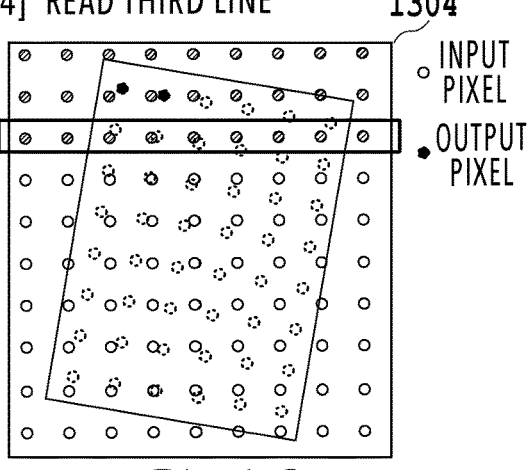
Figure 13E:
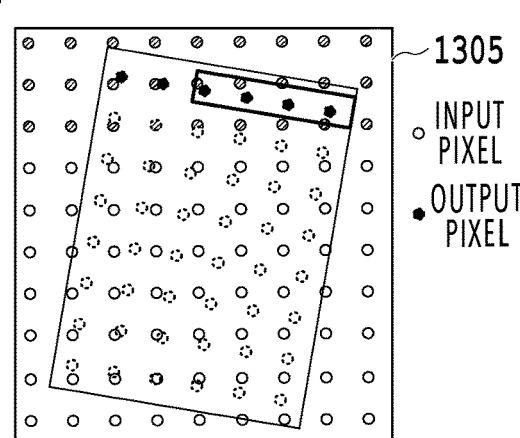
Figure 13F:
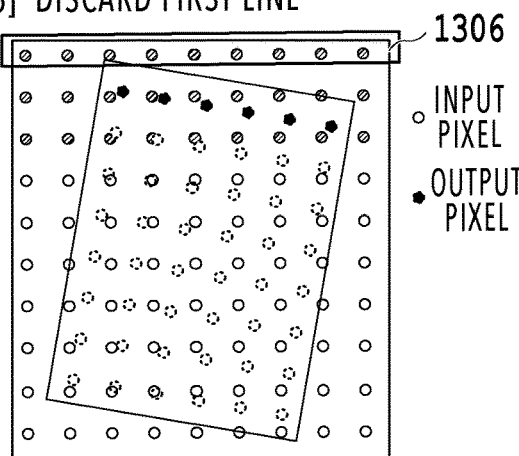

In a case where the angle of rotation is 0° or less (negative rotation), as shown in FIGS. 13A and 13B, even in a case where the ring buffer memory 301 already has the input data with which the output pixel at the left end of one line can be processed, it does not necessarily mean that the one line can be processed. In this case, as shown in FIG. 13C, the computation processing unit 302 performs processing on the pixels processible with the lines which have already been read into the ring buffer memory 301 at that point, and the values are outputted by the write DMAC 303 into the main memory 110. After that, no processing is performed until the necessary input data is read. As shown in FIG. 13D, the computation processing unit 302 resumes processing after another line of the image data is read into the ring buffer memory 301 and processing can be performed on the input image data. As shown in FIG. 13E, the output pixels obtained by processing by the computation processing unit 302 are outputted to the main memory 110. In this way, processing is continued to the rightmost output pixel of that line. Similarly to the case with 0° or greater, as shown in FIG. 13F, the ring buffer memory control unit (RD_CTRL) 304 obtains the number of the input lines that are no longer necessary and makes those lines overwritable by sequentially discarding image data one those lines in the ring buffer memory 301.

After that, the input data is sequentially stored from the main memory 110 into the ring buffer memory 301 until rotation processing can be performed on the next line. Although an example where data reading and data processing/outputting are performed sequentially is described here for the convenience of illustration, data reading and data processing/outputting are actually performed in parallel.

Figures 14A, 14B:
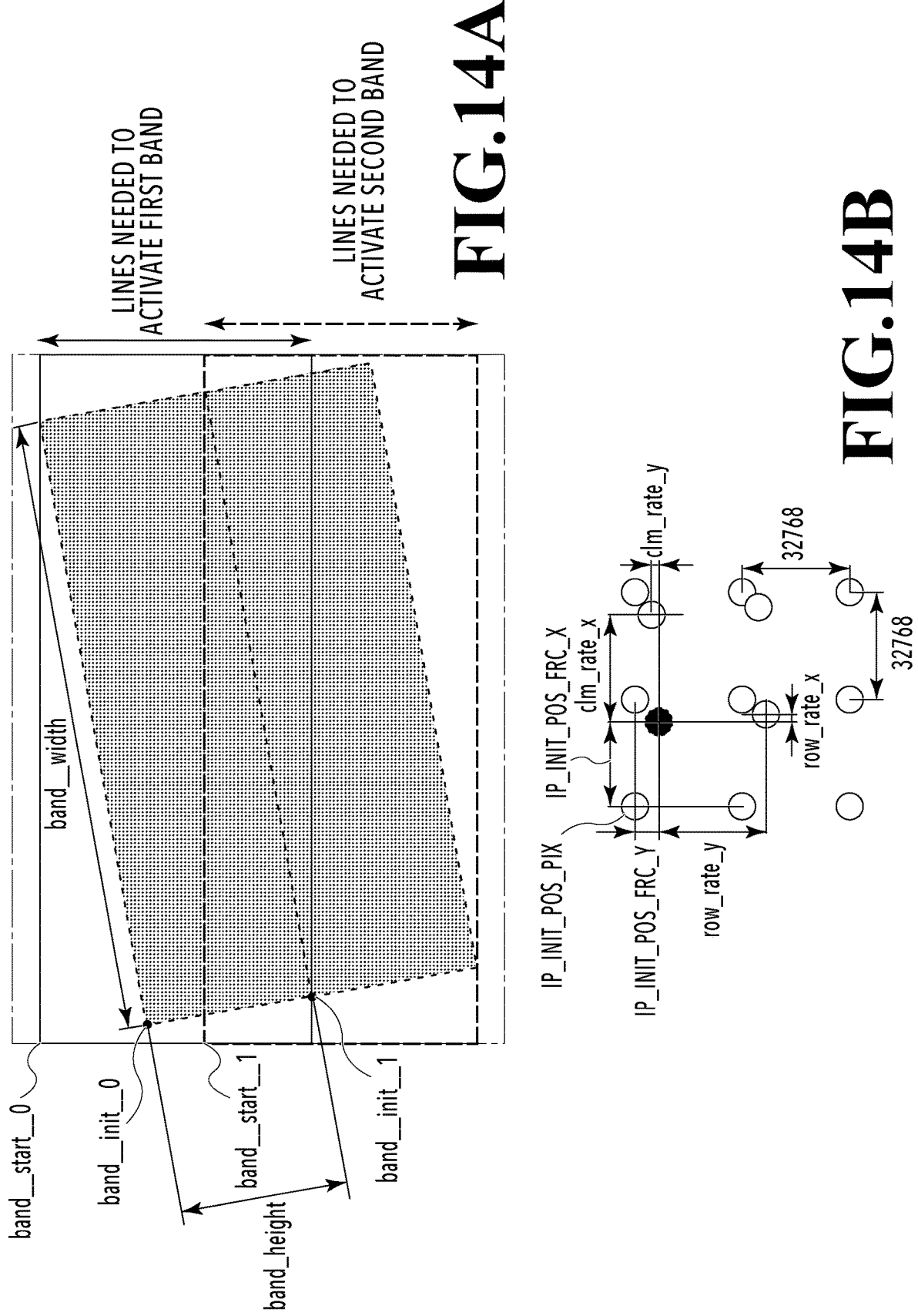
FIGS. 14A and 14B are diagrams illustrating a unit of an output block in the embodiment.

FIG. 14A is a diagram illustrating a unit of an output band in the present embodiment, and FIG. 14B is a diagram showing the positional relations between an output pixel indicated by "●" and its surrounding input pixels. The skew correction processing unit 107 is activated in units of an output band height set in a BAND_HEIGHT register. The position of the Y-coordinate of a pixel with the smallest Y-coordinate (a coordinate where the length obtained by dividing the pixel spacing by 32768 is 1) among the positions of input pixels necessary for calculation of output values of pixels within the first output band is set as band_start_0. In a case of negative rotation, the value of band_start_0 is (IP_INIT_POS_PIX_Y<<15)+IP_INIT_POS_FRC_Y. In a case of positive rotation, the value of band_start_0 is (IP_INIT_POS_PIX_Y<<15)+IP_INIT_POS_FRC_Y−clm_rate_y×(64−1). The position of the Y-coordinate of the pixel with the smallest Y-coordinate in the next band (the second band) is band_start_1 and can be calculated using Expression (7) below. Line-unit positions can be calculated by rounding off the low 15 bits of the band_start_0 and band_start_1.

$$band\_start\_1 = band\_start\_0 + row\_rate\_y * band\_height \qquad (7)$$

The (band_start_1 >> 15) is the first line in the input image used for processing on the second band, and after the first band is finished, a line prior to that can be sequentially discarded from the main memory 110.

With band_init_0 being the position of a processing start pixel for the first band and band_init_1 being the position of a processing start pixel for the second band, the X- and Y-coordinates of band_init_1 can be calculated using Expressions (8) and (9) below where band_init_x_1 and band_init_y_1 are the X-coordinate and the Y-coordinate of band_init_1, respectively.

In a case where the X-direction in an input image moves in a positive direction in a case where an output pixel is moved in the Y-direction by one pixel:

$$band\_init\_x\_1 = band\_init\_x\_0 + row\_rate\_x * band\_height, \qquad (8)$$

$$and\ band\_init\_y\_1 = band\_init\_y\_0 + row\_rate\_y * band\_height.$$

In a case where the X-direction in an input image moves in a negative direction in a case where an output pixel is moved in the Y-direction by one pixel:

$$band\_init\_x\_1 = band\_init\_x\_0 - row\_rate\_x * band\_height, \qquad (9)$$

$$and\ band\_init\_y\_1 = band\_init\_y\_0 + row\_rate\_y * band\_height.$$

Processing for the second band is performed similarly to the processing for the first band, but for the second band, variables are determined as follows. Specifically, values obtained by shifting band_init_x_1 and band_init_y_1 to the right by 15 bits are set as IP_INIT_POS_PIX_X and IP_INIT_POS_PIX_Y for the second band. The low 15 bits of band_init_x_1 and band_init_y_1 are set as IP_INIT_POS_FRC_X and IP_INIT_POS_FRC_Y for the second band.

Also, as shown in FIG. 14A, the number of lines of the input image necessary to activate processing of each band can be calculated using the following Expression (10) where band_width is the number of horizontal pixels (multiples of 64) of the output image as shown in FIG. 7A.

$$the\ number\ of\ necessary\ lines = \qquad (10)$$

$$(clm\_rate\_y * (band\_width - 1) + row\_rate\_y *$$

$$(band\_height - 1) + 32767)/32768 + 2$$

Figure 15:
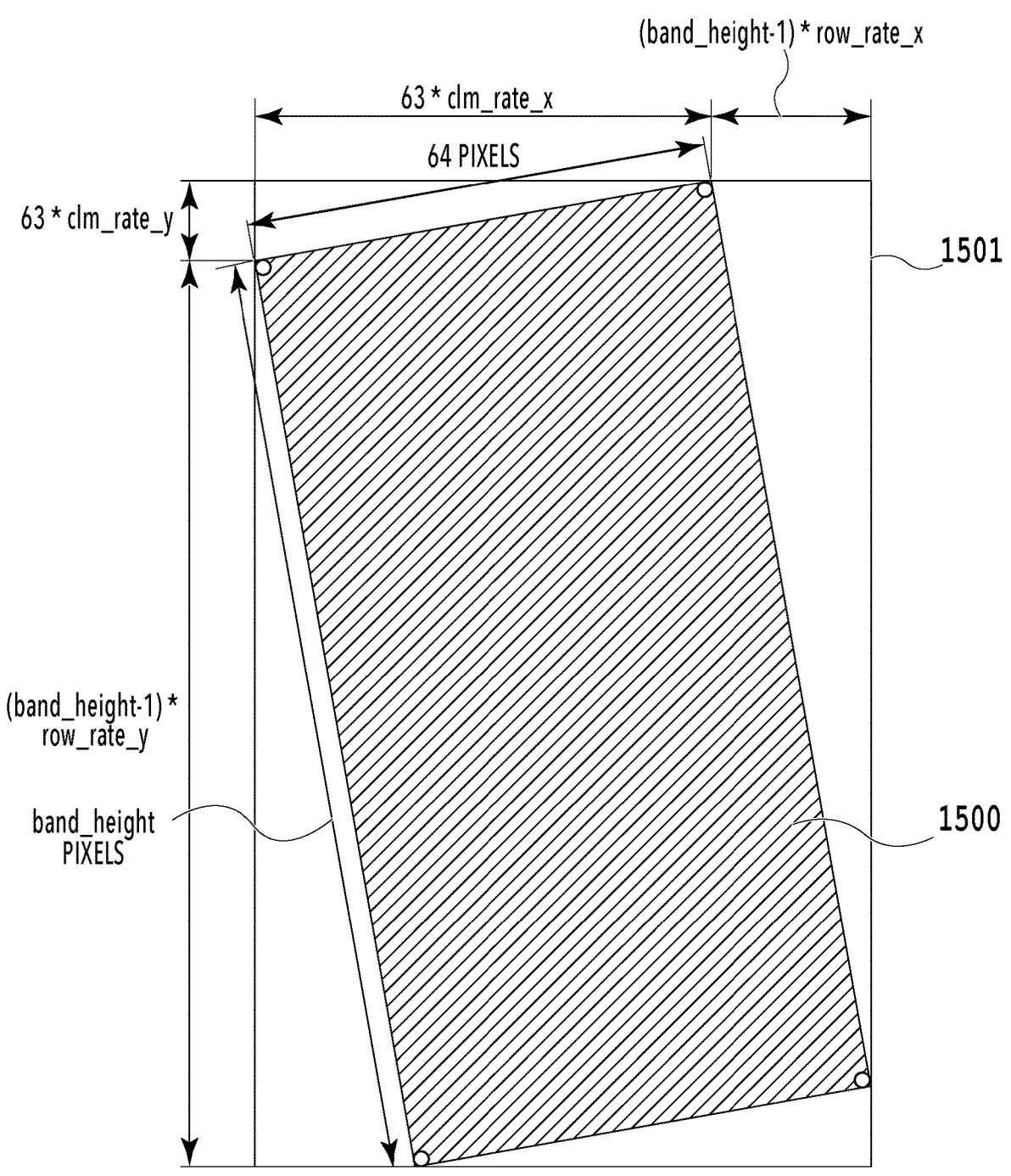
FIG. 15 is a diagram illustrating a unit of an input block in the embodiment.

FIG. 15 is a diagram illustrating a unit of an input block in the present embodiment. A region 1500 is an output block. A region 1501 is an input block set to encompass the output block. While the width of an output block is fixed at 64 pixels, the width and height of the input block needs to be changed according to the setting of the number of output lines of that block (band_height), the angle of rotation, and the scaling factor.

During processing, the computation processing unit 302 automatically performs, for the read DMAC 300, address setting of the sizes of these blocks and a block read pixel (the pixel at the upper left end of the input block). Then, the computation processing unit 302 performs the address setting operation consecutively until all the blocks to satisfy the output image width (band_width) are outputted.

Note that for the input blocks, the same size is used for all the blocks in a band. The size of an input block (the region 1501) in the Y-direction (the number of lines) is rd_blen_y and can be calculated using the following Expression (11):

$$rd\_blen\_y = (band\_height - 1) * row\_rate\_y + 63 * clm\_rate\_y. \qquad (11)$$

The size of an input block (the region 1501) in the X-direction (the number of pixels) is rd_blen_x and can be calculated using the following Expression (12):

$$rd\_blen\_x = 63 * clm\_rate\_x + (band\_height - 1) * row\_rate\_x. \qquad (12)$$

Note that increasing band_height increases rd_blen_x and therefore increases a necessary amount of the ring buffer memory 301. In a case of a small angle of rotation is small (i.e., small row_rate_x), the rate of increase of rd_blen_x in relation to a change in band_height is small, and therefore, there is only a small influence on memory costs.

In the present embodiment, the size of one line of the ring buffer memory 301 is set according to the maximum values of band_height and clm_rate_x. Managing input block lines with such a size unit enables simplification of address computation in the ring buffer memory 301.

Figure 16A:
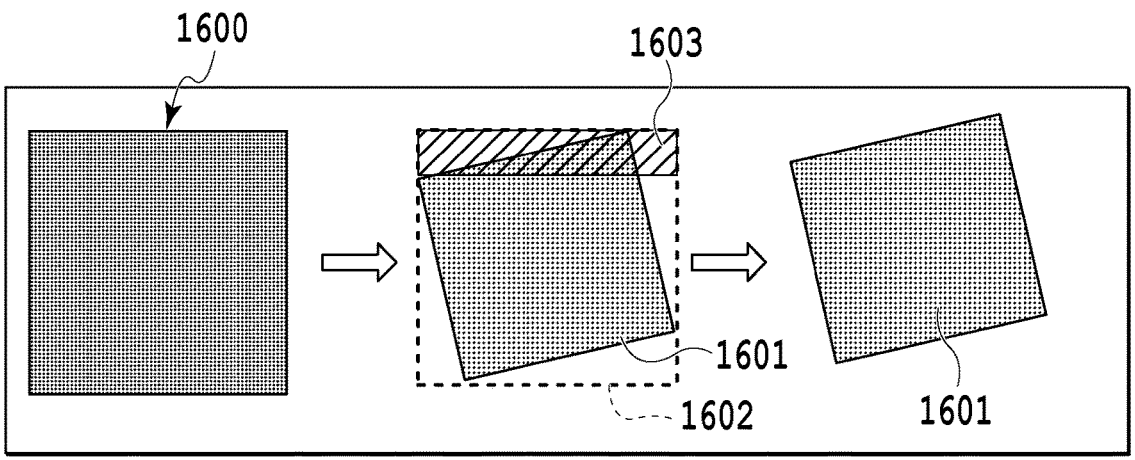
FIGS. 16A, 16B, and 16C are diagrams illustrating advantageous effects in accordance with the embodiment.
Figure 16B:
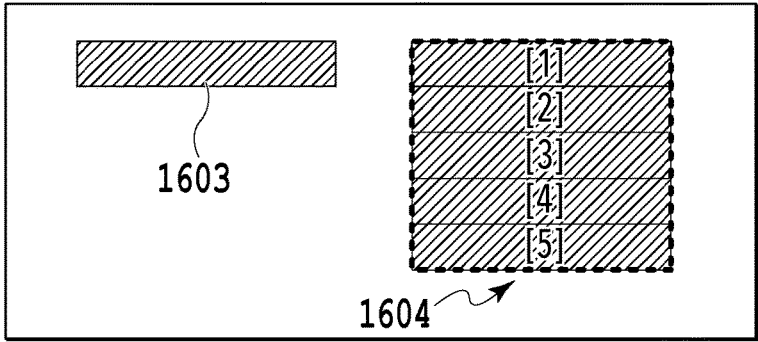
Figure 16C:
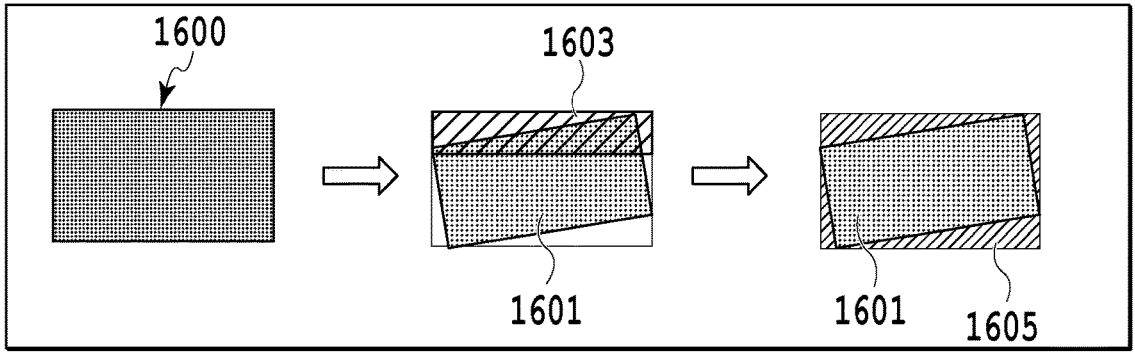

FIGS. 16A, 16B, and 16C are diagrams illustrating advantageous effects offered by the present embodiment. In FIG. 16A, a region 1600 denotes an input image. A region 1601 denotes an output block, and FIG. 16A shows an output image as well. A region 1602 denotes an input block. A region 1603 denotes the size of an area in the input image which is stored in the ring buffer memory 301 at once. Note that the input image shown in FIG. 16A is a small input image that can be processed only with one block using the configuration of the present embodiment.

In the present embodiment, as shown in FIG. 16A, once the ring buffer memory 301 that can store the region 1603 is activated once, the region 1602 indicating an output image (an output block) can be obtained from the region 1600 indicating the input image. As shown in FIG. 16A, even in a case where the input image is rotated at a large angle, the ring buffer memory 301 is activated once.

By contrast, in the configuration in Document 1, only an image block with the size defined as the size of the cache memory can be outputted. Thus, to output an output image indicated by the region 1601, the cache memory needs to be activated a plurality of times (see FIG. 9D). In this regard, the configuration of the present embodiment needs to activate the memory fewer times and therefore can shorten processing time required for rotation correction of a scanned image.

FIG. 16B is a diagram comparing the configuration of the present embodiment and the configuration of Document 1 in the memory size for reading an input image in a case where the input image is rotated by a large angle. The region 1603 at the left in FIG. 16B indicates the size of an area in the input image which is stored in the ring buffer memory 301 at once. In the present embodiment employing the ring buffer memory 301, once the ring buffer memory 301 capable of storing the region 1603 is activated once, rotation processing can be performed on the entire input image.

By contrast, in a case where the input image is processed by a single time of reading processing with the configuration shown in Document 1, cache memory large enough to be able to store the region 1602 is needed. Then, as shown with a region 1604 at the right in FIG. 16B, the size of the cache memory would be approximately five times that of the ring buffer memory 301 needed in the configuration of the present embodiment, which leads to increased costs for the apparatus.

Next, an example of performing image correction shown in FIG. 9D is considered. In a case where the configuration of the present embodiment is employed, as shown in FIG. 16C, the ring buffer memory 301 is used. With the method according to Document 1, in order to obtain an output image (the region 902), it is necessary to read, from the main memory, the total amount of reading 903 of input blocks with a size approximately four times larger than the size of the image cache 802, as shown in FIG. 9D.

FIG. 16C shows an example where the configuration of the present embodiment is employed. Even with the ring buffer memory 301 of a size (the region 1603) almost the same as the size of the image cache 802 shown in FIG. 9D, the input image (the region 1600) can be sequentially read from the main memory 110. Use of the ring buffer memory 301 makes a total amount of reading 1605 shown in FIG. 16C less than half the total amount of reading 903 of input blocks shown in FIG. 9D. Thus, the present embodiment can also reduce the amount of data transfer to the memory.

As thus described, the following advantageous effects are offered in a case where, in the skew correction processing unit 107 that performs rotation correction processing on an image, an internal SRAM in which to store image data read from the main memory 110 in units of blocks is managed in the ring buffer form.

It is possible to lower the cost needed for implementation of internal memory of the apparatus for the same input block size.

It is possible to reduce image processing time and the amount of data transfer to external memory because the vertical width of the input block can be increased for the same internal memory size.

Because the vertical width of an input block can be set to any size for the same internal memory size, it is possible to optimize the storage capacity of external memory needed and to optimize the balance between the amount of data transfer to the external memory and the image processing time.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-201045, filed Dec. 16, 2022, which is hereby incorporated by reference wherein in its entirety.

What is claimed is:

1. An image processing apparatus that performs rotation correction on a scanned image obtained by scanning of an original document, comprising:
   a ring buffer memory configured to store a partial image representing part of a block image obtained by dividing a band image obtained by dividing the scanned image in a unit of a band, further in a unit of a block;
   a memory control unit configured to control a storage status of the partial image in the ring buffer memory;
   a processing unit configured to perform rotation processing on the partial image stored in the ring buffer memory and output a rotated partial image; and
   a combining unit configured to combine a plurality of the rotated partial images outputted from the processing unit and output a rotated block image corresponding to the block image before being divided, wherein
   the memory control unit sequentially discards, from the ring buffer memory, the partial image having been subjected to the rotation processing by the processing unit and sequentially stores, in the ring buffer memory, the partial image to be subjected to the subsequent rotation processing.

2. The image processing apparatus according to claim 1, wherein
   the processing unit stops the rotation processing after executing a last round of the rotation processing for the band image, and
   the processing unit ends the rotation processing after executing a last round of the rotation processing for the scanned image.

3. The image processing apparatus according to claim 2, wherein
   the processing unit resumes the rotation processing in a case where the partial image for performing a first round of the rotation processing in the next band images is stored in the ring buffer memory.

4. The image processing apparatus according to claim 1, wherein
   a storage capacity of the combining unit is larger than that of the ring buffer memory.

5. The image processing apparatus according to claim 1, wherein the unit of the block is determined based on the rotated partial image.

6. The image processing apparatus according to claim 1, wherein a region of the block image has a size encompassing a region of the rotated block image.

7. The image processing apparatus according to claim 1, wherein a vertical size of the rotated block image is variable according to an angle of rotation.

8. The image processing apparatus according to claim 1, wherein a horizontal size of the block image is determined according to an angle of rotation and vertical and horizontal sizes of the rotated block image.

9. A method of controlling an image processing apparatus including a ring buffer memory that stores a partial image representing part of a block image obtained by dividing a band image obtained by dividing a scanned image in a unit of a band, further in a unit of a block, the scanned image being obtained by scanning of an original document, the method comprising:

controlling a storage status of the partial image in the ring buffer memory;

performing rotation processing on the partial image stored in the ring buffer memory and outputting a rotated partial image;

combining a plurality of the rotated partial images outputted in the outputting a rotated partial image, and outputting a rotated block image corresponding to the block image before being divided; and sequentially discarding, from the ring buffer memory, the partial image having been subjected to the rotation processing in the outputting a rotated partial image, and sequentially storing, in the ring buffer memory, the partial image to be subjected to the subsequent rotation processing.

10. A non-transitory computer readable storage medium storing a program for causing a computer to perform a method of controlling an image processing apparatus including a ring buffer memory that stores a partial image representing part of a block image obtained by dividing a band image obtained by dividing a scanned image in a unit of a band, further in a unit of a block, the scanned image being obtained by scanning of an original document, the method comprising:

controlling a storage status of the partial image in the ring buffer memory;

performing rotation processing on the partial image stored in the ring buffer memory and outputting a rotated partial image;

combining a plurality of the rotated partial images outputted in the outputting a rotated partial image, and outputting a rotated block image corresponding to the block image before being divided; and sequentially discarding, from the ring buffer memory, the partial image having been subjected to the rotation processing in the outputting a rotated partial image, and sequentially storing, in the ring buffer memory, the partial image to be subjected to the subsequent rotation processing.

* * * * *